United States Patent
Sano et al.

(10) Patent No.: US 11,584,835 B2
(45) Date of Patent: Feb. 21, 2023

(54) LAMINATED SUBSTRATE AND METHOD FOR MANUFACTURING THE SAME

(71) Applicant: Mitsubishi Chemical Corporation, Chiyoda-ku (JP)

(72) Inventors: Mitsutoshi Sano, Tokyo (JP); Yoshimi Koyama, Tokyo (JP); Yusuke Ishie, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/351,127

(22) Filed: Mar. 12, 2019

(65) Prior Publication Data
US 2019/0211164 A1     Jul. 11, 2019

Related U.S. Application Data

(63) Continuation of application No. PCT/JP2017/033255, filed on Sep. 14, 2017.

(30) Foreign Application Priority Data

Sep. 14, 2016 (JP) .............................. JP2016-179491
Sep. 14, 2016 (JP) .............................. JP2016-179492

(51) Int. Cl.
*C08J 5/04* (2006.01)
*B32B 5/26* (2006.01)
(Continued)

(52) U.S. Cl.
CPC .................. *C08J 5/048* (2013.01); *B32B 5/26* (2013.01); *B32B 27/08* (2013.01); *B32B 27/32* (2013.01);
(Continued)

(58) Field of Classification Search
CPC ... C08J 5/048; C08J 5/047; C08J 5/043; C08J 5/121; C08J 5/042; C08J 5/046;
(Continued)

(56) References Cited

U.S. PATENT DOCUMENTS

| 6,066,395 A | 5/2000 | Miyoshi et al. |
| 2009/0004453 A1 | 1/2009 | Murai et al. |

(Continued)

FOREIGN PATENT DOCUMENTS

| JP | A-08-118379 | 5/1996 |
| JP | A-2001-040562 | 2/2001 |

(Continued)

OTHER PUBLICATIONS

Extended European Search Report dated Jul. 10, 2019 in Patent Application No. 17850981.6.
(Continued)

*Primary Examiner* — Brian Handville
(74) *Attorney, Agent, or Firm* — Grüneberg and Myers PLLC

(57) ABSTRACT

A laminated substrate obtained by laminating a carbon fiber reinforced resin substrate (a) containing a carbon fiber and a thermoplastic resin fiber and a glass fiber reinforced resin substrate (B) containing a glass fiber and a thermoplastic resin, wherein a content of the carbon fiber in the carbon fiber reinforced resin substrate (a) is 20% by mass or more and less than 100% by mass with respect to a total mass of the carbon fiber reinforced resin substrate (a), and the carbon fiber reinforced resin substrate (a) has an elongation percentage of from 20% to 150% at a maximum load point in a MD direction at a temperature of a melting point of a resin constituting the thermoplastic resin fiber+20° C., an elon-
(Continued)

gation percentage of from 20% to 150% at a maximum load point in a TD direction, and a tensile stress of $1.0 \times 10^{-3}$ to $1.0 \times 10^{-1}$ MPa.

18 Claims, 8 Drawing Sheets

(51) Int. Cl.
B32B 27/08 (2006.01)
B32B 27/32 (2006.01)
B32B 27/34 (2006.01)
C08J 5/12 (2006.01)

(52) U.S. Cl.
CPC .............. *B32B 27/34* (2013.01); *C08J 5/042* (2013.01); *C08J 5/043* (2013.01); *C08J 5/046* (2013.01); *C08J 5/047* (2013.01); *C08J 5/121* (2013.01); *B32B 2250/20* (2013.01); *B32B 2260/021* (2013.01); *B32B 2260/046* (2013.01); *B32B 2262/0246* (2013.01); *B32B 2262/0253* (2013.01); *B32B 2262/0284* (2013.01); *B32B 2262/101* (2013.01); *B32B 2262/106* (2013.01); *B32B 2262/14* (2013.01); *B32B 2307/54* (2013.01); *B32B 2307/546* (2013.01); *B32B 2307/718* (2013.01); *B32B 2307/738* (2013.01); *B32B 2323/10* (2013.01); *B32B 2377/00* (2013.01); *B32B 2419/00* (2013.01); *B32B 2479/00* (2013.01); *B32B 2605/08* (2013.01); *B32B 2605/10* (2013.01); *B32B 2605/18* (2013.01); *C08J 2323/12* (2013.01); *C08J 2377/00* (2013.01)

(58) Field of Classification Search
CPC ... C08J 2323/12; C08J 2377/00; B32B 27/08; B32B 27/32; B32B 27/34; B32B 5/26; B32B 2377/00; B32B 2323/10; B32B 2262/0253; B32B 2479/00; B32B 2605/10; B32B 2260/021; B32B 2307/546; B32B 2262/0246; B32B 2262/0284; B32B 2605/18; B32B 2250/20; B32B 2262/14; B32B 2307/738; B32B 2605/08; B32B 2419/00; B32B 2307/54; B32B 2307/718; B32B 2260/046; B32B 2262/101; B32B 2262/106; B32B 2307/732; B32B 2260/023; B32B 2250/02; B32B 5/022

See application file for complete search history.

(56) References Cited

U.S. PATENT DOCUMENTS

| | | | |
|---|---|---|---|
| 2014/0147642 A1* | 5/2014 | Weinberg | B29C 66/45 428/212 |
| 2015/0044438 A1 | 2/2015 | Baser | |
| 2015/0202807 A1* | 7/2015 | Sano | B29C 43/20 428/688 |
| 2016/0214346 A1* | 7/2016 | Hatanaka | B32B 5/18 |
| 2016/0303824 A1 | 10/2016 | Takebe et al. | |
| 2016/0339669 A1 | 11/2016 | Miyoshi et al. | |
| 2018/0327946 A1 | 11/2018 | Ota et al. | |

FOREIGN PATENT DOCUMENTS

| | | |
|---|---|---|
| JP | A-2002-154176 | 5/2002 |
| JP | B-4161409 | 10/2008 |
| JP | A-2014-050982 | 3/2014 |
| JP | A-2014-051555 | 3/2014 |
| JP | A-2015-515553 | 5/2015 |
| JP | A-2017-095662 | 6/2017 |
| WO | WO 2007/097436 A1 | 8/2007 |
| WO | WO 2014/162873 A1 | 10/2014 |
| WO | WO-2015029634 A1 * | 3/2015 ............. B32B 5/12 |
| WO | WO 2015/108021 A1 | 7/2015 |
| WO | WO 2016/099896 A1 | 6/2016 |

OTHER PUBLICATIONS

Combined Chinese Office Action and Search Report dated Jun. 28, 2020 in Patent Application No. 201780056336.1 (with unedited computer generated English translation of Office Action only), 16 pages.
Miyairi, Engineering materials, 2004, 12, p. 76-80 (full translation).
Plastic Processing Databook (2nd edition), 1st print, The Nikkan Kogyo Shinbun, Ltd., Jan. 28, 2002 (Jan. 28, 2002), pp. 2 to 3 (full translation).
International Search Report dated Nov. 21, 2017, in PCT/JP2017/033255 (with English Translation).
Office Action dated Aug. 28, 2018, in Japanese Patent Application No. 2017-552526 (with machine translation).

* cited by examiner

DIVISION INTO NINE CELLS

DIVISION INTO NINE CELLS

LAMINATED SUBSTRATE AND METHOD FOR MANUFACTURING THE SAME

This application is a continuation application of International Application No. PCT/JP2017/033255, filed on Sep. 14, 2017, which claims the benefit of priority of the prior Japanese Patent Application No. 2016-179491 filed in Japan on Sep. 14, 2016 and the prior Japanese Patent Application No. 2016-179492 filed in Japan on Sep. 14, 2016, the entire contents of which are incorporated herein by reference.

TECHNICAL FIELD

The present invention relates to a laminated substrate and a method for manufacturing the same.

BACKGROUND ART

In recent years, the products are desired to have a lighter weight in the fields of transportation equipment such as motor vehicles, railroads, and aviation, robots, electronic equipment, furniture, building materials and the like from the viewpoint of environmental conservation and energy conservation for the construction of a sustainable society.

As described in Non-Patent Document 1, laminated structures, by which weight saving and cost saving are expected, have already been applied in a wide range of fields as a means for obtaining composite materials. The background to widely put such laminated structures in practical use is a manufacturing method in which laminate molding is easily conducted and the productivity is excellent as a method utilizing the properties of the respective materials. As the basic laminated structures, there are structures such as a sandwich structure and a hybrid structure and the effect thereof is exerted by selecting a lightweight material at a place with a small moment.

In addition, fiber reinforced resin composite materials, which are materials containing reinforcing fibers, exhibit superior specific strength and specific rigidity as compared with metal materials and can thus contribute to weight saving. For this reason, fiber reinforced composite materials containing carbon fibers, aramid fibers, glass fibers, and the like as reinforcing fibers have been widely used in structural materials such as aircrafts and motor vehicles, general industries such as tennis rackets, golf shafts, and fishing rods, sports applications, and the like to utilize the high specific strength/specific modulus.

Examples of the forms of reinforcing fibers used in these may include woven fabrics fabricated using continuous fibers, UD sheets in which fibers are aligned in one direction, random mats fabricated using cut fibers, and nonwoven fabrics.

As fiber-resin composite materials, there are composite materials containing thermosetting resins as a matrix, and examples of a molding method suitable for a complicated shape such as a three-dimensional shape may include a substrate formed of SMC. SMC refers to one obtained by disposing a fiber structure called chopped strand impregnated with a thermosetting resin in a molding die in a sheet shape and heating and pressurizing the fiber structure to mold a plastic, and it is possible to form a complicated three-dimensional structure since SMC exhibits relatively high flowability. Hitherto, as the matrix resin of fiber reinforced composite materials, thermosetting resins as described above have been mainly used. In recent years, however, fiber reinforced composite materials containing thermoplastic resins as a matrix have attracted attention from the viewpoint of cost, rapidity and easiness of molding, further, recyclability after use, and the like (Patent Document 1).

As a fiber-resin composite material, there is a composite material containing a thermoplastic resin as a matrix, the composite material exhibits flowability similar to thermosetting property and is a molding method suitable for complicated shapes such as a three-dimensional shape. In addition, the composite material exhibits favorable processability and can be thus repeatedly molded. However, it is difficult to hold a certain amount of fibers at the target place in the case of imparting partial functionality to fiber reinforced composite materials.

In general, thermoplastic resins have a higher viscosity than thermosetting resins, thus it takes a long time to impregnate the fiber substrate with the resin, and as a result, there has been a problem that the tact time until molding is prolonged.

Patent Document 2 describes thermoplastic stamping molding as a means for solving these problems. This is a molding method in which a chopped fiber impregnated with a thermoplastic resin in advance is heated to a temperature equal to or higher than the melting point and then charged into a part of the mold, then the mold is immediately closed, and the fiber and resin flow in the mold to obtain a product shape and are then cooled/molded. However, there have been problems that it is impossible to fabricate a thin material since the fiber and resin flow in the mold, the fiber orientation is disturbed, control is difficult, and the like. In addition, the fibers are uniformly dispersed in a short fiber form as a means for improving the impregnating property, and it is thus possible to prevent a resin-rich portion from generating in the gap between the bundles of fibers or the resin from not being impregnated into the fiber bundle and thus forming an unimpregnated portion. However, there have been problems that it is impossible to increase the fiber length, further, voids are generated in the molded body when the fiber volume content is increased, and this leads to a decrease in mechanical properties (Patent Document 3).

There is a substrate for plastics (mixed mat) which can be easily impregnated with a thermoplastic matrix resin, is uniform, and exhibits excellent handling property and three-dimensional moldability by fabricating the substrate in which the reinforcing fiber and the thermoplastic resin are mixed under certain conditions in advance (Patent Document 4). However, reinforcing fibers are generally considered to be more expensive than resins, and it is thus not greatly effective to use reinforcing fibers in the entire member in consideration of cost and the like.

CITATION LIST

Patent Document

Patent Document 1: JP 8-118379 A
Patent Document 2: JP 4161409 B1
Patent Document 3: WO 2007/097436 A
Patent Document 4: JP 2014-50982 A

Non-Patent Document

Non-Patent Document 1: Industrial Material, issued December 2004, P. 76-80

SUMMARY OF THE INVENTION

Problem to be Solved by the Invention

The invention has been made to solve the above problems, and an object thereof is to provide a partially reinforceable laminate which exhibits excellent flowability at the time of molding and having a sufficiently secured reinforcing effect by a mixed mat.

Means for Solving Problem

The present inventors have carried out intensive investigations to solve the above problems, as a result, have found out that the above problems can be solved by use of a carbon fiber reinforced resin substrate having a certain elongation percentage at a temperature of a melting point of a resin constituting the carbon fiber reinforced resin substrate+from 15° C. to 20° C., and thus have completed the invention. In other words, the gist of the invention resides in the following [1] to [15].

[1] A laminated substrate obtained by laminating a carbon fiber reinforced resin substrate (a) containing a carbon fiber and a thermoplastic resin fiber and a glass fiber reinforced resin substrate (B) containing a glass fiber and a thermoplastic resin, in which a content of the carbon fiber in the carbon fiber reinforced resin substrate (a) is 20% by mass or more and less than 100% by mass with respect to a total mass of the carbon fiber reinforced resin substrate (a), and the carbon fiber reinforced resin substrate (a) has an elongation percentage of from 20% to 150% at a maximum load point in a MD direction at a temperature of a melting point of a resin constituting the thermoplastic resin fiber+20° C., an elongation percentage of from 20% to 150% at a maximum load point in a TD direction, and a tensile stress of $1.0 \times 10^{-3}$ to $1.0 \times 10^{-1}$ MPa.

[2] A laminated substrate, in which adjacent surfaces of a carbon fiber reinforced resin substrate (A) containing a carbon fiber and a thermoplastic resin and a glass fiber reinforced resin substrate (B) containing a glass fiber and a thermoplastic resin are bonded to each other, an average value of deviations (1) determined by the following uniformity test method 1-1 is 5% or less, and an average value of deviations (2) determined by the following uniformity test method 1-2 is 8% or less:

(Uniformity Test Method 1-1)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. three portions 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) are extracted from the cross-sectional photograph obtained;
3. area proportions (%) occupied by a carbon fiber at the portions 1 are respectively determined and an average value (%) of the area proportions at the three portions 1 is calculated; and
4. a difference between the average value (%) and the area proportion (%) occupied by a carbon fiber at each portion 1 is determined as a deviation (1), and (Uniformity Test Method 1-2)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. a portion 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) is extracted from the cross-sectional photograph obtained;
3. the portion 1 is equally divided into nine cells, and area proportions (%) occupied by a carbon fiber in the respective divided cells are calculated;
4. an average value (%) of the area proportions occupied by a carbon fiber in the equally divided nine cells is calculated from the area proportions (%) occupied by a carbon fiber in the respective cells; and
5. a difference between the average value (%) and the area proportion (%) occupied by a carbon fiber in each cell is determined as a deviation (2).

[3] The laminated substrate according to [2], in which a content percentage of the glass fiber in the glass fiber reinforced resin substrate (B) is more than 0% by mass and less than 60% by mass with respect to a total mass of the glass fiber reinforced resin substrate (B), an average value of deviations (3) determined by the following uniformity test method 2-1 is 10% or less, and an average value of deviations (4) determined by the following uniformity test method 2-2 is 10% or less:

(Uniformity Test Method 2-1)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. three portions 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) are extracted from the cross-sectional photograph obtained;
3. area proportions (%) occupied by a glass fiber at the portions 2 are respectively determined and an average value (%) of the area proportions at the three portions 2 is calculated; and
4. a difference between the average value (%) and the area proportion (%) occupied by a glass fiber at each portion 2 is determined as a deviation (3), and (Uniformity Test Method 2-2)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. a portion 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) is extracted from the cross-sectional photograph obtained;
3. the portion 2 is equally divided into nine cells, and area proportions (%) occupied by a glass fiber in the respective divided cells are calculated;
4. an average value (%) of the area proportions occupied by a glass fiber in the equally divided nine cells is calculated from the area proportions (%) occupied by a glass fiber in the respective cells; and
5. a difference between the average value (%) and the area proportion (%) occupied by a glass fiber in each cell is determined as a deviation (4).

[4] The laminated substrate according to [2] or [3], in which an interface height difference determined by the following test for interface height difference measurement is $2.0 \times 10^{-3}$ to 1.5 mm:

(Test for Reference Plane Height Difference Measurement)

1. a laminated substrate formed of a carbon fiber reinforced resin substrate (A) and a glass fiber reinforced resin substrate (B) is cut perpendicular to a planar direction;
2. a distance from an outer surface of the carbon fiber reinforced resin substrate (A) to a closest reference plane portion and a distance from the outer surface of the carbon fiber reinforced resin substrate (A) to a farthest reference plane portion are measured in a range from a center in a transverse direction of the cut laminate to 25 mm left and 25 mm right; and
3. a difference between the measurement values obtained is determined as a reference plane height difference.

[5] The laminated substrate according to [1], in which an average fiber diameter of the thermoplastic resin fibers in the carbon fiber reinforced resin substrate (a) is from 20 to 100 μm.

[6] The laminated substrate according to any one of [1] to [5], in which an average fiber length of the glass fibers in the glass fiber reinforced resin substrate (B) is 5 mm or more.

[7] The laminated substrate according to [1] or [5], in which the thermoplastic resin in the glass fiber reinforced resin substrate (B) and a resin constituting the thermoplastic resin fiber in the carbon fiber reinforced resin substrate (a) are polypropylene, and an elongation percentage at a maximum load point in a MD direction of the carbon fiber reinforced resin substrate (A) at a temperature of a melting point of the polypropylene+20° C. is from 100% to 150% and an elongation percentage at a maximum load point in a TD direction is from 100% to 150%.

[8] The laminated substrate according to [1] or [5], in which the thermoplastic resin in the glass fiber reinforced resin substrate (B) and a resin constituting the thermoplastic resin fiber of the carbon fiber reinforced resin substrate (a) are polyamide, and an elongation percentage at a maximum load point in a MD direction of the carbon fiber reinforced resin substrate (A) at a temperature of a melting point of the polyamide+20° C. is from 20% to 150%.

[9] The laminated substrate according to any one of [1], [5], [7], or [8], in which a rate of area increase δ of the carbon fiber reinforced resin substrate (a) in the following test is less than 5.0%:

(Test for Evaluation on Rate of Area Increase)

the glass fiber reinforced resin substrate (B) and the carbon fiber reinforced resin substrate (a) are cut into 12 cm×12 cm;

the cut glass fiber reinforced resin substrate (B) is preliminarily heated at 215° C. for 13 minutes, subsequently the cut carbon fiber reinforced resin substrate (a) is laminated so that the glass fiber reinforced resin substrate (B) and the carbon fiber reinforced resin substrate (a) accord with each other in planar view;

the laminate obtained is set at a center of a pressing machine provided with a metal frame of 20 cm×20 cm so that the glass fiber reinforced resin substrate (B) becomes an underside and pressed at 5 MPa and a temperature of a melting point of a resin of the carbon fiber reinforced resin substrate (a)+20° C. for 10 minutes;

an area of the carbon fiber reinforced resin substrate (a) after pressing (namely, the area of the carbon fiber reinforced resin substrate (A)) is measured as Sample (α) Area; and a rate of area increase δ of the carbon fiber reinforced resin substrate (a) is calculated by the following equation:

$$\delta = \{(\text{Sample}(\alpha)\text{Area} - \text{Sample}(\beta)\text{Area})/\text{area of test piece}\} \times 100$$

Sample (β) Area: area of test piece before pressing=144 cm², and area of test piece=144 cm².

[10] The laminated substrate according to any one of [1], [5], [7], [8] or [9], in which a thickness of the carbon fiber reinforced resin substrate (a) when a pressure of 3 MPa is applied to the carbon fiber reinforced resin substrate (a) and then removed from the carbon fiber reinforced resin substrate (a) is 40% or more and 95% or less of a thickness of the carbon fiber reinforced resin substrate (a) before the pressure of 3 MPa is applied to the carbon fiber reinforced resin substrate (a).

[11] The laminated substrate according to any one of [1], [5], [7], [8], [9], or [10], in which a basis weight of the carbon fiber reinforced resin substrate (a) is from 100 g/m² to 800 g/m².

[12] The laminated substrate according to any one of [1], [5], [7], [8], [9], [10], or [11], in which an average fiber length of the carbon fibers in the fiber reinforced resin substrate (a) is from 10 to 150 mm.

[13] A carbon fiber reinforced resin substrate for reinforcing a glass fiber reinforced resin substrate, which contains a carbon fiber and a thermoplastic resin fiber and in which a content of the carbon fiber is 20% by mass or more and less than 100% by mass with respect to a total mass of the carbon fiber reinforced resin substrate, and the carbon fiber reinforced resin substrate has an elongation percentage of from 20% to 150% at a maximum load point in a MD direction at a temperature of a melting point of a resin constituting the thermoplastic resin fiber+20° C., an elongation percentage of from 20% to 150% at a maximum load point in a TD direction, and a tensile stress of $1.0 \times 10^{-3}$ to $1.0 \times 10^{-1}$ MPa.

[14] A method for manufacturing the laminated substrate according to any one of [1], [5], [7], [8], [9], [10], [11], or [12], which includes laminating the carbon fiber reinforced resin substrate (a) and the glass fiber reinforced resin substrate (B) and heating and pressurizing the laminate obtained at from 120° C. to 250° C., and from 1 to 10 MPa to integrate the carbon fiber reinforced resin substrate (a) and the glass fiber reinforced resin substrate (B).

[15] A carbon fiber reinforced resin substrate containing a carbon fiber and a thermoplastic resin fiber, in which a content of the carbon fiber in the carbon fiber reinforced resin substrate is 20% by mass or more and less than 100% by mass with respect to a total mass of the carbon fiber reinforced resin substrate, and the carbon fiber reinforced resin substrate has an elongation percentage of from 20% to 150% at a maximum load point in a MD direction at a temperature of a melting point of a resin constituting the thermoplastic resin fiber+20° C., an elongation percentage of from 20% to 150% at a maximum load point in a TD direction, and a tensile stress of $1.0 \times 10^{-3}$ to $1.0 \times 10^{-1}$ MPa.

Effect of the Invention

The laminated substrate of the invention has high industrial value since it exhibits excellent flowability at the time of molding to make it possible to easily fabricate a molded body having a complicated three-dimensional shape and also to efficiently impart mechanical properties and a reinforcing effect when laminating two or more kinds of fiber-resin composite materials.

MODE(S) FOR CARRYING OUT THE INVENTION

Hereinafter, the invention will be described in more detail.

Figure 1:
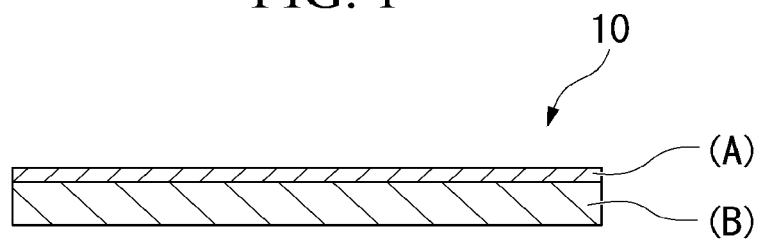
FIG. 1 is a diagram which illustrates a configuration example of a laminated substrate of the invention.

As illustrated in FIG. 1, the laminated substrate of the invention is a laminated substrate obtained by laminating a carbon fiber reinforced resin substrate (a) containing a carbon fiber and a thermoplastic resin fiber and a glass fiber reinforced resin substrate (B) containing a glass fiber and a thermoplastic resin, in which the content of the carbon fiber in the carbon fiber reinforced resin substrate (A) is 20% by mass or more and less than 100% by mass with respect to the total mass of the carbon fiber reinforced resin substrate (a). Furthermore, the carbon fiber reinforced resin substrate (a) has an elongation percentage of from 20% to 150% at a maximum load point in a MD direction at a temperature of a melting point of a resin constituting the thermoplastic resin fiber+20° C., an elongation percentage of from 20% to 150% at a maximum load point in a TD direction, and a tensile stress of $1.0 \times 10^{-3}$ to $1.0 \times 10^{-1}$ MPa.

The "laminated substrate in which adjacent surfaces of a carbon fiber reinforced resin substrate (A) containing a carbon fiber and a thermoplastic resin and a glass fiber reinforced resin substrate (B) containing a glass fiber and a thermoplastic resin are bonded to each other" in the invention is obtained by laminating the carbon fiber reinforced resin substrate (a) and the glass fiber reinforced resin substrate (B) and heating and pressurizing the laminate thus obtained to integrate the carbon fiber reinforced resin substrate (a) and the glass fiber reinforced resin substrate (B). It is preferable that the carbon fiber reinforced resin substrate (A) and the glass fiber reinforced resin substrate (B) are bonded to each other from the viewpoint of the reinforcing effect. It is preferable that the glass fiber reinforced resin substrate (B) is directly laminated on the carbon fiber reinforced resin substrate (A). An adhesive layer may be provided between the carbon fiber reinforced resin substrate (A) and the glass fiber reinforced resin substrate (B).

Incidentally, the carbon fiber reinforced resin substrate (a) or the carbon fiber reinforced resin substrate (A) may cover the whole of one side or both sides of the glass fiber reinforced resin substrate (B). However, the carbon fiber reinforced resin substrate (a) or the carbon fiber reinforced resin substrate (A) may be partly disposed so as to be present at the portion at which strength is required when the laminated substrate is molded in the case of suppressing the amount of the carbon fiber reinforced resin substrate (a) or the carbon fiber reinforced resin substrate (A) used from the viewpoint of cost.

<Carbon Fiber Reinforced Resin Substrate (a)>

The carbon fiber reinforced resin substrate (a) in the invention is formed of a carbon fiber and a thermoplastic resin fiber. The content of carbon fiber in the carbon fiber reinforced resin substrate (a) is 20% by mass or more and less than 100% by mass, preferably 50% by mass or more and 90% by mass or less, and more preferably 60% by mass or more and 80% by mass or less with respect to the total mass of the carbon fiber reinforced resin substrate (a). When the content of carbon fiber is too low, the dispersibility of carbon fiber increases and it is thus difficult to obtain a reinforcing effect. In addition, when the content of carbon fiber is too high, the impregnating property of the matrix resin decreases, thus it is impossible to obtain a reinforcing effect and the shape-shaping property deteriorates.

In addition, the carbon fiber reinforced resin substrate (a) has an elongation percentage of from 20% to 150% at the maximum load point in the MD direction at a temperature of the melting point of the resin constituting the thermoplastic resin fiber in the carbon fiber reinforced resin substrate (a)+20° C. The elongation percentage is preferably 30% or more and preferably 120% or less and more preferably 100% or less since the shaping property decreases when the elongation percentage is too low and the dispersibility increases when the elongation percentage is too high. Specifically, the elongation percentage at the maximum load point in the MD direction is preferably from 30% to 120% and more preferably from 30% to 100%. Incidentally, the elongation percentage at the maximum load point in the MD direction is preferably from 100% to 150% in a case in which the resin is polypropylene. The elongation percentage at the maximum load point in the MD direction is preferably from 20% to 150% in a case in which the resin is polyamide.

Furthermore, the carbon fiber reinforced resin substrate (a) has an elongation percentage of from 20% to 150% at the maximum load point in the TD direction at a temperature of the melting point of the resin constituting the thermoplastic resin fiber in the carbon fiber reinforced resin substrate (a)+20° C. The elongation percentage is preferably 30% or more and preferably 120% or less and more preferably 100% or less since the shaping property decreases when the elongation percentage is too low and the dispersibility increases when the elongation percentage is too high. Specifically, the elongation percentage at the maximum load point in the TD direction is preferably from 30% to 120% and more preferably from 30% to 100%. Incidentally, the elongation percentage at the maximum load point in the TD direction is preferably from 100% to 150% in a case in which the resin is polypropylene.

The elongation percentages at the maximum load point in the MD direction and TD direction described above are measured in conformity to ISO 9073-3. Although the detailed experimental conditions will be described in the section of Examples, the elongation percentage at the maximum load point in the MD direction and the elongation percentage at the maximum load point in the TD direction in the invention are values determined under the detailed experimental conditions described in the section of Examples.

Furthermore, the carbon fiber reinforced resin substrate (a) of the invention has a tensile stress of $1.0 \times 10^{-3}$ to $1.0 \times 10^{-1}$ MPa at a temperature of the melting point of the resin constituting the thermoplastic resin fiber in the carbon fiber reinforced resin substrate (a)+20° C. The tensile stress is preferably $5.0 \times 10^{-3}$ Pa or more and more preferably $7.0 \times 10^{-3}$ Pa or more and preferably $9.0 \times 10^{-2}$ Pa or less and more preferably $7.0 \times 10^{-2}$ Pa or less since the dispersibility increases when the tensile stress is too low and the shaping property decreases when the tensile stress is too high. Specifically, the tensile stress is preferably from $5.0 \times 10^{-3}$ to $9.0 \times 10^{-2}$ Pa and more preferably from $7.0 \times 10^{-3}$ to $9.0 \times 10^{-2}$ Pa.

As the method for measuring the tensile stress, the tensile stress is measured in conformity to ISO 9073-3. Although the detailed experimental conditions will be described later, the "tensile stress at a temperature of the melting point of the resin constituting the thermoplastic resin fiber in the carbon fiber reinforced resin substrate (a)+20° C." in the invention is a value determined under the detailed experimental conditions described in the section of Examples.

The temperature when measuring the elongation percentage at the maximum load point in the MD direction, the elongation percentage at the maximum load point in the TD direction, and the tensile strength is 180° C. in a case in which the resin constituting the thermoplastic resin fiber in the carbon fiber reinforced resin substrate (a) is polypropylene having a melting point of 160° C.

It is preferable that the carbon fiber reinforced resin substrate (a) in the invention has a rate of area increase δ of less than 5.0% in the test for evaluation on the rate of area increase to be described below from the viewpoint of the partial reinforcing effect. The rate of area increase δ is more preferably 3.0% or less since it is impossible to control the flowability of fiber and it is difficult to obtain a partial reinforcing effect when the rate of area increase δ is too high. The rate of area increase δ may be 0% or may be 0% or more.

(Test for Evaluation on Rate of Area Increase)

The glass fiber reinforced resin substrate (B) and the carbon fiber reinforced resin substrate (a) are cut into 12 cm×12 cm.

Figure 2:
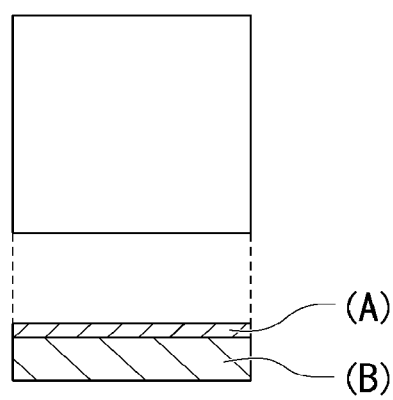
FIG. 2 is a diagram which illustrates a test for evaluation on rate of area increase.

The cut glass fiber reinforced resin substrate (B) is preliminarily heated at 215° C. for 13 minutes, subsequently the cut carbon fiber reinforced resin substrate (a) is laminated thereon so that the glass fiber reinforced resin substrate (B) and the carbon fiber reinforced resin substrate (A) accord with each other in planar view (FIG. 2).

Figure 3:
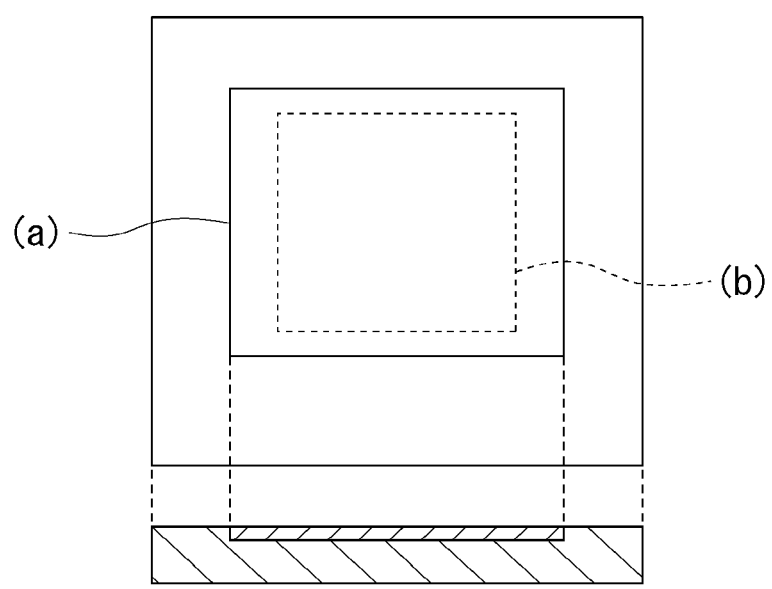
FIG. 3 is a diagram which illustrates a test for evaluation on rate of area increase.

The laminate thus obtained is set at the center of a pressing machine provided with a metal frame of 20 cm×20 cm so that the glass fiber reinforced resin substrate (B) becomes an underside and pressed at 5 MPa and a temperature of the melting point of the resin constituting the thermoplastic resin fiber in the carbon fiber reinforced resin substrate (a)+20° C. for 10 minutes (FIG. 3).

The area of the carbon fiber reinforced resin substrate (a) after pressing in planar view is measured as Sample (α) Area.

The rate of area increase δ of the carbon fiber reinforced resin substrate (a) is calculated by the following equation.

$$\delta = \{(\text{Sample}(\alpha)\text{Area} - \text{Sample}(\beta)\text{Area})/\text{area of test piece}\} \times 100$$

In the above equation, the Sample (β) Area is the area of the test piece before pressing, specifically 144 cm². In addition, the area of the test piece is also specifically 144 cm².

It is preferable that the carbon fiber reinforced resin substrate (a) exhibits cushioning property from the viewpoint of shape-shaping property and reinforcing effect. It is preferable that the thickness of the carbon fiber reinforced resin substrate (a) when a pressure of 3 MPa is applied to the carbon fiber reinforced resin substrate (a) and then removed therefrom is 40% or more and 95% or less of the thickness thereof before the pressure of 3 MPa is applied thereto. Incidentally, the thickness can be measured using a commercially available electronic caliper in the present specification.

In addition, it is preferable that the basis weight of the carbon fiber reinforced resin substrate (a) is from 100 g/m² to 800 g/m². The reinforcing effect is low when the basis weight is too low, and the shaping property is affected when the basis weight is too high. The basis weight of the carbon fiber reinforced resin substrate (a) is more preferably 200 g/cm² or more and more preferably 600 g/cm² or less.

Incidentally, the thickness of the carbon fiber reinforced resin substrate (a) to be used in the invention is not particularly limited but is generally from 0.5 mm to 10 mm as the thickness thereof before lamination, heating, and integration. In addition, the thickness of the carbon fiber reinforced resin substrate (A) in the state of a laminate which is laminated, heated, and integrated is generally from 0.1 mm to 2 mm.

<Carbon Fiber Reinforced Resin Substrate (A)>

The carbon fiber reinforced resin substrate (A) in the invention is formed of a carbon fiber and a thermoplastic resin. The content of carbon fiber in the carbon fiber reinforced resin substrate (A) is 20% by mass or more and less than 100% by mass, preferably 50% by mass or more and 90% by mass or less, and more preferably 60% by mass or more and 80% by mass or less with respect to the total mass of the carbon fiber reinforced resin substrate (A). When the content of carbon fiber is too low, the dispersibility of carbon fiber increases and it is difficult to obtain a reinforcing effect. In addition, when the content is too high, the impregnating property of matrix resin decreases, thus it is impossible to obtain a reinforcing effect and the shape-shaping property deteriorates.

<<Carbon Fiber>>

The carbon fiber is not particularly limited, and examples thereof may include a polyacrylonitrile (PAN)-based carbon fiber and a PITCH-based carbon fiber.

A preferable carbon fiber is a carbon fiber of which the strand tensile strength measured in conformity to ISO 10618 is 1.0 GPa or more and 9.0 GPa or less and the strand tensile modulus is 150 GPa or more and 1000 GPa or less. A more preferable carbon fiber is a carbon fiber of which the strand tensile strength measured in conformity to ISO 10618 is 1.5 GPa or more and 9.0 GPa or less and the strand tensile modulus is 200 GPa or more and 1000 GPa or less.

<Tensile Strength of Resin Impregnated Strand and Elastic Modulus of Resin Impregnated Strand>

With a resin composition obtained by mixing 108 g (90 parts by mass) of KAYAHARD (MCD) (Nippon Kayaku Co., Ltd.), 3.6 g (3 parts by mass) of N,N-benzyldimethylamine, and 60 g (50 parts by mass) of acetone, 120 g (100 parts by mass) of ERL-4221 manufactured by NIPPON CARBIDE INDUSTRIES CO., INC. was impregnated and then heated at 130° C. for 120 minutes to be cured, thereby obtaining a resin impregnated strand. The resin impregnated strand obtained is used to determine the tensile strength and tensile modulus by the test method (in conformity to ISO 10618) for carbon fiber-determination of tensile properties of resin impregnated yarn, and the tensile strength and tensile modulus thus determined are adopted as the tensile strength of resin impregnated strand and the elastic modulus of resin impregnated strand.

The average fiber length of carbon fibers is preferably from 10 to 150 mm and more preferably from 30 to 80 mm since it is difficult to obtain a homogeneous carbon fiber reinforced resin substrate (a) or carbon fiber reinforced resin substrate (A) when the average fiber length is too short and the shaping property is affected when the average fiber length is too long.

Generally, as the carbon fiber is longer, a structural material exhibiting superior mechanical properties is obtained but it is difficult to obtain a structural material having a complicated three-dimensional shape particularly at the time of stamping molding since the flowability decreases. When the average fiber length of carbon fibers is the upper limit value or less, excellent flowability is obtained at the time of shaping and the carbon fiber and the matrix resin are likely to flow. Hence, it is easy to obtain a structural material having a complicated three-dimensional shape such as ribs and bosses. In addition, when the average fiber length of carbon fibers is the lower limit value or more, it is possible to manufacture a structural material exhibiting excellent mechanical properties.

In the present specification, the average fiber length can be measured by the following method.

(Method for Measuring Average Fiber Length)

Examples of the method for measuring the number average fiber length may include a method in which a resin component contained in a fiber reinforced composite material is removed by a burning-off method, the reinforcing fibers remained are filtered, and the length thereof is then measured by microscopy and a method in which the fiber reinforced composite material is thinly stretched by a melting method and the reinforcing fibers are permeated and observed to measure the length thereof. As the measurement, 400 reinforcing fibers are randomly selected, the lengths thereof are measured using an optical microscope down to 1 µm unit, and the number average fiber length is calculated by $\Sigma Li/400$ (Li: measured fiber length (i=1, 2, 3, . . . , 400). Incidentally, the methods in which reinforcing fibers are taken out from a fiber reinforced composite material by a burning-off method and the like do not cause any special difference in the results to be obtained.

Incidentally, the weight average fiber length of the carbon fibers in a molded article can be adjusted by, for example, molding conditions. Specifically, it is possible to set the average fiber length of the carbon fibers in a molded article to a desired range by appropriately changing the disposition method, disposition size, and the like.

The average fiber diameter of carbon fibers is preferably from 1 to 50 µm and more preferably from 5 to 15 m since it is difficult to obtain a reinforcing effect when the average fiber diameter is too small and the fiber is likely to be broken and it is impossible to obtain a reinforcing effect when the average fiber diameter is too large.

In the present specification, the average fiber diameter can be measured by the following method.

(Method for Measuring Average Fiber Diameter)

The average fiber diameter of carbon fibers can be easily measured using an optical microscope, an electron microscope or the like. For example, arbitrary 400 carbon fibers are selected from a cross-sectional photograph of fiber of a substrate taken at 5,000-fold using an electron microscope, the fiber diameters thereof are measured, and the simple average value thereof is determined as the average fiber diameter. The average value of the long diameter and the short diameter is adopted as the fiber diameter in a case in which the shape of the cross section is not a circular shape, for example, an elliptical diameter.

<<Thermoplastic Resin Fiber>>

The resin constituting the thermoplastic resin fiber is not particularly limited, and examples thereof may include a polyamide resin (nylon 6 (melting point: 220° C.), nylon 66 (melting point: 260° C.), nylon 12 (melting point: 175° C.), nylon MXD 6 (melting point: 237° C.), or the like), a polyolefin resin (low density polyethylene (melting point: 95° C. to 130° C.), high density polyethylene (melting point: 120° C. to 140° C.), polypropylene (melting point: 165° C.), or the like), a modified polyolefin resin (modified polypropylene resin (melting point: 160° C. to 165° C.) or the like), a polyester resin (polyethylene terephthalate, polybutylene terephthalate, or the like), a polycarbonate resin (glass transition temperature: 145° C.), a polyamideimide resin, a polyphenylene oxide resin, a polysulfone resin, a polyethersulfone resin, a polyether ether ketone resin, a polyether imide resin, a polystyrene resin, an ABS resin, a polyphenylene sulfide resin, a liquid crystal polyester resin, a copolymer of acrylonitrile with styrene, and a copolymer of nylon 6 with nylon 66.

Examples of the modified polyolefin resin may include a resin obtained by modifying a polyolefin resin with an acid such as maleic acid.

One kind of thermoplastic resin may be used singly, two or more kinds thereof may be used concurrently, or two or more kinds thereof may be used as a polymer alloy.

As the thermoplastic resin, it is preferable to contain at least one kind selected from the group consisting of a polyolefin resin, a modified polypropylene resin, a polyamide resin, and a polycarbonate resin from the viewpoint of balance among the adhesive property to a carbon fiber, impregnating property to a carbon fiber, and the raw material cost of thermoplastic resin. Polypropylene and polyamide are particularly preferable from the viewpoint of spinnability.

The thermoplastic resin to be used as the constituent resin of the thermoplastic resin fiber constituting the carbon fiber reinforced resin substrate (a) and the thermoplastic resin to be used as the constituent resin of the glass fiber reinforced resin substrate (B) may be the same as or different from each other, but it is preferable to use the same kind of thermoplastic resin from the viewpoint of adhesive property. Specifically, it is preferable that both of these are polypropylene or polyamide, and it is particularly preferable that both of these are polypropylene.

In addition, the thermoplastic resin constituting the carbon fiber reinforced resin substrate (A) and the thermoplastic resin to be used as the constituent resin of the glass fiber reinforced resin substrate (B) may be the same as or different from each other, but it is preferable to use the same kind of thermoplastic resin from the viewpoint of adhesive property. Specifically, it is preferable that both of these are polypropylene or polyamide, and it is particularly preferable that both of these are polypropylene.

The average fiber diameter of thermoplastic resin fibers is preferably from 20 to 150 µm and more preferably from 30 to 70 µm. The average fiber length of thermoplastic resin fibers is preferably 30 mm or more. In a case in which the average fiber length is less than 30 mm, it is impossible to uniformly fabricate the fibers in the defibrating step and needle punching step and the function of the carbon fiber reinforced resin substrate (a) is not exerted.

<Glass Fiber Reinforced Resin Substrate (B)>

The glass fiber reinforced resin substrate (B) in the invention is formed of a glass fiber and a thermoplastic resin. The content percentage of glass fiber in the glass fiber reinforced resin substrate (B) is preferably more than 0% by mass and less than 60% by mass, more preferably from 20% by mass to 50% by mass, and particularly preferably from 30% by mass to 50% by mass with respect to the total mass of the glass fiber reinforced resin substrate (B). The impact resistance is inferior when the mass ratio of the glass fibers is too low, and the flowability and shaping property decrease when the mass ratio is too high.

The temperature when measuring the elongation percentage at the maximum load point in the MD direction is 180° C. in a case in which the resin constituting the thermoplastic resin fiber in the glass fiber reinforced resin substrate (B) is polypropylene having a melting point of 160° C.

<<Glass Fiber>>

The average fiber length of the glass fibers to be used in the invention is preferably from 1 to 100 mm, more preferably from 3 to 70 mm, still more preferably 5 mm or more, still more preferably from 5 to 50 mm, particularly preferably from 10 to 50 mm, and most preferably from 10 to 35 mm. In general, as the glass fiber is longer, a structural material exhibiting superior mechanical properties is obtained.

The average fiber diameter of glass fibers is preferably from 1 to 50 µm and more preferably from 5 to 20 µm. It is difficult to obtain impact resistance when the average fiber diameter is too small, and the fiber is likely to be broken and thus the impact resistance is not sufficiently exerted when the average fiber diameter is too large.

<<Thermoplastic Resin>>

As the thermoplastic resin constituting the glass fiber reinforced resin substrate (B), it is possible to use the same resins as those mentioned above as the resin constituting the thermoplastic resin fiber of the carbon fiber reinforced resin substrate (a).

<Laminated Substrate>

In the laminated substrate of the invention, it is preferable that adjacent surfaces of the carbon fiber reinforced resin substrate (A) and the glass fiber reinforced resin substrate (B) are bonded to each other and the average value of deviations (1) determined by the following uniformity test method 1-1 is 5% or less from the viewpoint that interfacial peeling caused by laminating different kinds of fiber-resin composite materials does not occur. It is preferable that the average value of deviations (1) is 0% or more. Specifically, the average value of deviations (1) determined by the uniformity test method 1-1 is preferably from 0% to 5%. It is preferable that the average value of deviations (2) determined by the following uniformity test method 1-2 is 8% or less. It is preferable that the average value of deviations (2) determined by the uniformity test method 1-2 is 0% or more. Specifically, the average value of deviations (2) determined by the uniformity test method 1-2 is preferably from 0% to 8% and more preferably from 0% to 5%.

Variations are caused at the interface and the peel strength at the adhesive interface drops when the average value of deviations (1) is more than 5% or the average value of deviations (2) is 8% or more. It is more preferable as the deviations determined by the uniformity test methods 1-1 and 1-2 are all as small as possible. In addition, the standard deviation of the area proportions occupied by carbon fibers in the equally divided nine cells calculated by the uniformity test method 1-2 is preferably 5% or less.

(Uniformity Test Method 1-1)

1. A laminated substrate formed of a carbon fiber reinforced resin substrate (A) and a glass fiber reinforced resin substrate (B) is cut perpendicular to a planar direction, and a cross section of the cut laminated substrate is photographed.

2. Three portions 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) are extracted from the cross-sectional photograph obtained.

3. Area proportions (%) occupied by a carbon fiber at the portions 1 are respectively determined and an average value (%) of the area proportions at the three portions 1 is calculated.

4. A difference between the average value (%) and the area proportion (%) occupied by a carbon fiber at each portion 1 is determined as a deviation (1).

In the uniformity test method 1-1, the determination of deviations (1) can be conducted by the following 1. to 5. being carried out.

1. A laminated substrate formed of a carbon fiber reinforced resin substrate (A) and a glass fiber reinforced resin substrate (B) is cut perpendicular to a planar direction, and a cross section of the cut laminated substrate is photographed. The cross section may be photographed, for example, using an SEM (JEOL JSM-5600) and reflection electrons at an acceleration voltage of 15 kV and a magnification of 100-fold.

Figure 4:
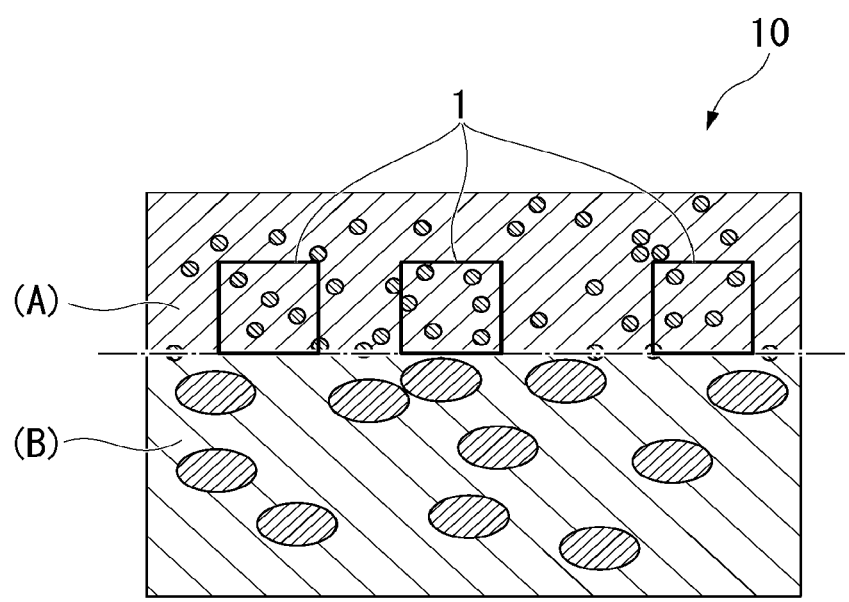
FIG. 4 is a diagram which illustrates a portion 1 in a uniformity test method 1-1.

2. Three portions 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) are extracted from the cross-sectional photograph thus obtained (FIG. 4).

3. Area proportions (%) occupied by a carbon fiber at the portions 1 are respectively calculated. For the calculation, an image subjected to binarization processing using the Image J apparatus is used. The conditions at that time are luminance type: 8 bits, threshold: pixe 150 to 250, area: Infinity, and circularity: 0.0 to 1.0.

4. An average value (%) of the area proportions occupied by a carbon fiber at the three portions 1 is calculated.

5. A difference between the average value (%) and the area proportion (%) occupied by a carbon fiber at each portion 1 is determined as a deviation (1).

(Uniformity Test Method 1-2)

1. A laminated substrate formed of a carbon fiber reinforced resin substrate (A) and a glass fiber reinforced resin substrate (B) is cut perpendicular to a planar direction, and a cross section of the cut laminated substrate is photographed.

2. A portion 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) is extracted from the cross-sectional photograph obtained.

3. The portion 1 is equally divided into nine cells, and area proportions (%) occupied by a carbon fiber in the respective divided cells are calculated.

4. An average value (%) of the area proportions occupied by a carbon fiber in the equally divided nine cells is calculated from the area proportions (%) occupied by a carbon fiber in the respective cells.

5. A difference between the average value (%) and the area proportion (%) occupied by a carbon fiber in each cell is determined as a deviation (2).

In the uniformity test method 1-2, the determination of deviations (2) can be conducted by the following 1. to 5. being carried out.

1. A laminated substrate formed of a carbon fiber reinforced resin substrate (A) and a glass fiber reinforced resin substrate (B) is cut perpendicular to a planar direction, and a cross section of the cut laminated substrate is photographed. Photographing of the cross section may be conducted in the same manner as in the uniformity test method 1-1.

2. A portion 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) is extracted from the cross-sectional photograph thus obtained (FIG. 4).

Figure 5:
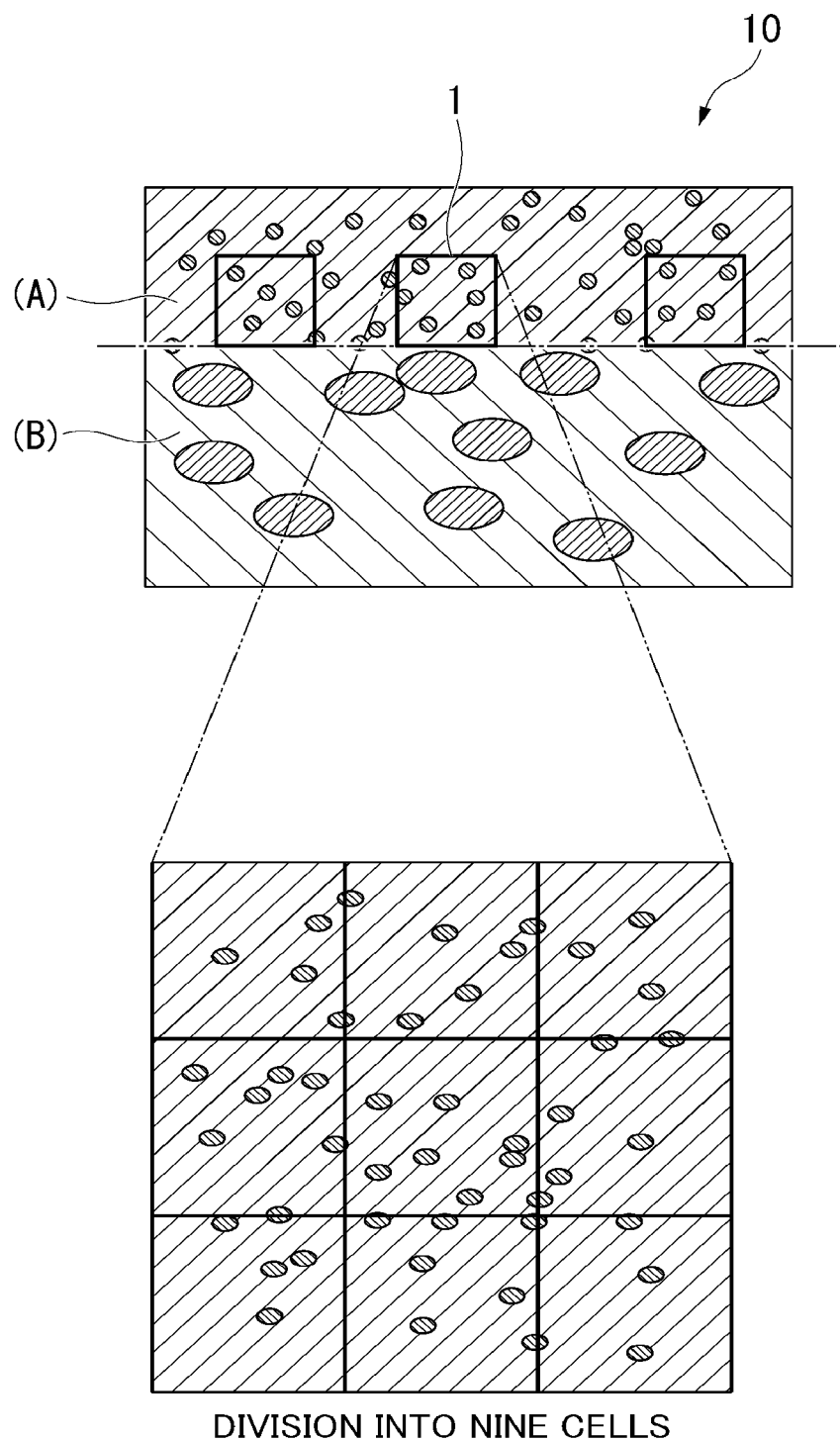
FIG. 5 is a diagram which illustrates division into nine cells in a uniformity test method 1-2.

3. The portion 1 is equally divided into nine cells (FIG. 5), and area proportions (%) occupied by a carbon fiber in the respective divided cells are calculated. The calculation may be conducted in the same manner as in the uniformity test method 1-1.

4. An average value (%) of the area proportions occupied by a carbon fiber in the equally divided nine cells is calculated from the area proportions (%) occupied by a carbon fiber in the respective cells.

5. A difference between the average value (%) and the area proportion (%) occupied by a carbon fiber in each cell is determined as a deviation (2).

Furthermore, in the laminated substrate of the invention, it is preferable that the content percentage of glass fiber in the glass fiber reinforced resin substrate (B) is more than 0% by mass and less than 60% by mass with respect to the total mass of the glass fiber reinforced resin substrate (B), the average value of deviations (3) determined by the following uniformity test method 2-1 is 10% or less, and the average value of deviations (4) determined by the following uniformity test method 2-2 is 10% or less from the viewpoint that interfacial peeling caused by laminating different kinds of fiber-resin composite materials does not occur in the same manner as in the carbon fiber reinforced resin substrate (A). It is preferable that the average value of deviations (3) determined by the uniformity test method 2-1 is 0% or more. Specifically, it is preferable that the average value of deviations (3) determined by the uniformity test method 2-1 is from 0% to 10%. It is preferable that the average value of deviations (4) determined by the uniformity test method 2-2 is 0% or more. Specifically, it is preferable that the average value of deviations (4) determined by the uniformity test method 2-2 is from 0% to 10%.

(Uniformity Test Method 2-1)

1. A laminated substrate formed of a carbon fiber reinforced resin substrate (A) and a glass fiber reinforced resin substrate (B) is cut perpendicular to a planar direction, and a cross section of the cut laminated substrate is photographed.

2. Three portions 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) are extracted from the cross-sectional photograph obtained.

3. Area proportions (%) occupied by a glass fiber at the portions 2 are respectively determined and an average value (%) of the area proportions at the three portions 2 is calculated.

4. A difference between the average value (%) and the area proportion (%) occupied by a glass fiber at each portion 2 is determined as a deviation (3).

In the uniformity test method 2-1, the determination of a standard deviation (3) can be conducted by the following 1. to 5. being carried out.

1. A laminated substrate formed of a carbon fiber reinforced resin substrate (A) and a glass fiber reinforced resin substrate (B) is cut perpendicular to a planar direction, and a cross section of the cut laminated substrate is photographed. Photographing of the cross section may be conducted in the same manner as in the uniformity test method 1-1.

Figure 6:
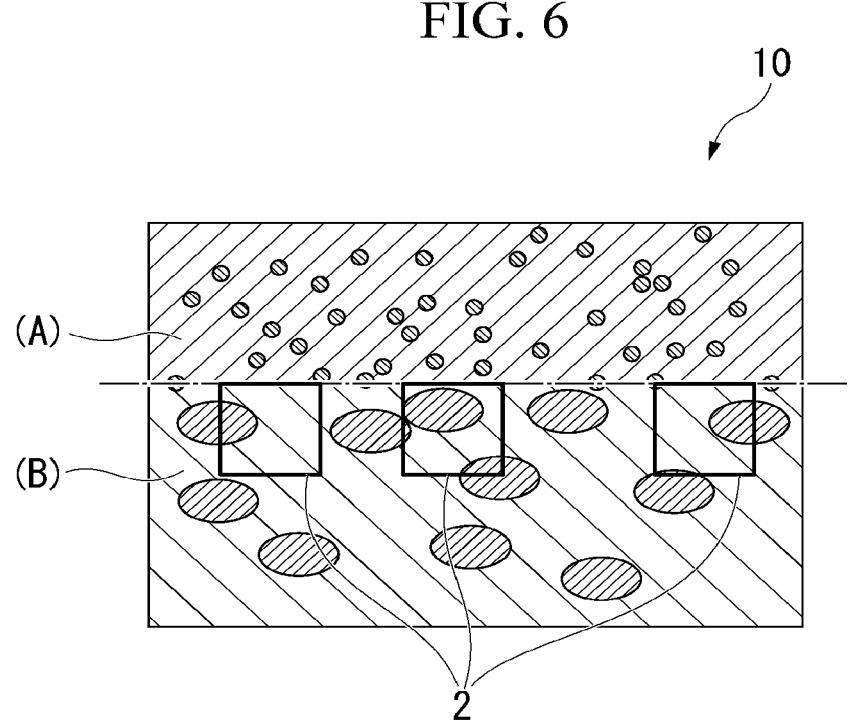
FIG. 6 is a diagram which illustrates a portion 2 in a uniformity test method 2-1.

2. Three portions 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) are extracted from the cross-sectional photograph obtained (FIG. 6).

3. Area proportions (%) occupied by a glass fiber at the portions 2 are respectively calculated. The calculation may be conducted in the same manner as in the uniformity test method 1-1.

4. An average value (%) of the area proportions occupied by a glass fiber at the three portions 2 is calculated.

5. A difference between the average value (%) and the area proportion (%) occupied by a glass fiber at each portion 2 is determined as a standard deviation (3).

(Uniformity Test Method 2-2)

1. A laminated substrate formed of a carbon fiber reinforced resin substrate (A) and a glass fiber reinforced resin substrate (B) is cut perpendicular to a planar direction, and a cross section of the cut laminated substrate is photographed.

2. A portion 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) is extracted from the cross-sectional photograph obtained.

3. The portion 2 is equally divided into nine cells, and area proportions (%) occupied by a glass fiber in the respective divided cells are calculated.

4. An average value (%) of the area proportions occupied by a glass fiber in the equally divided nine cells is calculated from the area proportions (%) occupied by a glass fiber in the respective cells.

5. A difference between the average value (%) and the area proportion (%) occupied by a glass fiber in each cell is determined as a deviation (4).

In the uniformity test method 2-2, the determination of standard deviation (4) can be conducted by the following 1. to 5. being carried out.

1. A laminated substrate formed of a carbon fiber reinforced resin substrate (A) and a glass fiber reinforced resin substrate (B) is cut perpendicular to a planar direction, and a cross section of the cut laminated substrate is photographed. Photographing of the cross section may be conducted in the same manner as in the uniformity test method 1-1.

2. A portion 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) is extracted from the cross-sectional photograph obtained.

Figure 7:
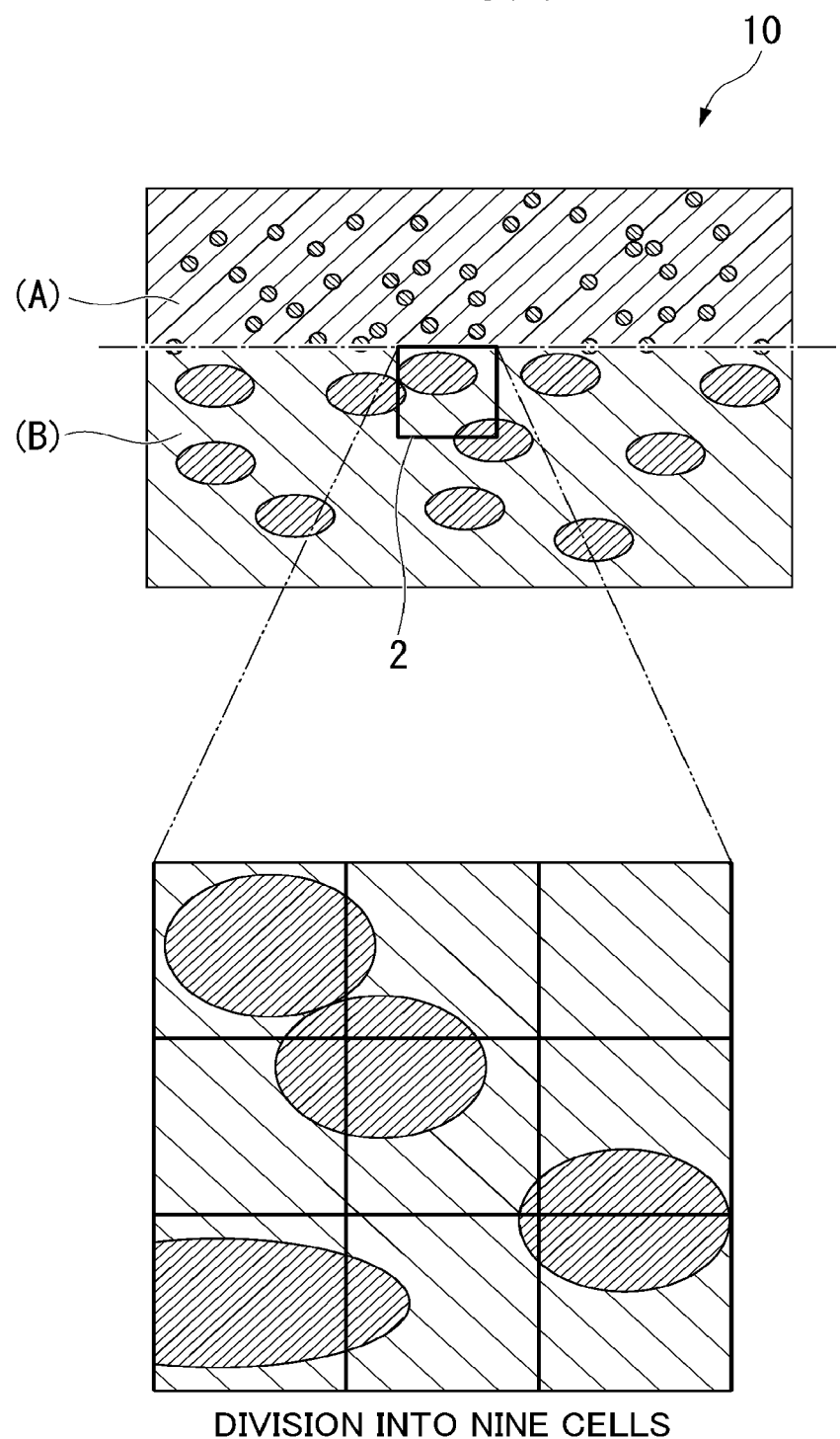
FIG. 7 is a diagram which illustrates division into nine cells in a uniformity test method 2-2.

3. The portion 2 is equally divided into nine cells (FIG. 7), and area proportions (%) occupied by a glass fiber in the respective divided cells are calculated. The calculation may be conducted in the same manner as in the uniformity test method 1-1.

4. An average value (%) of the area proportions occupied by a glass fiber in the equally divided nine cells is calculated from the area proportions (%) occupied by a glass fiber in the respective cells.

5. A difference between the average value (%) and the area proportion (%) occupied by a glass fiber in each cell is determined as a standard deviation (4).

Incidentally, in the invention, the "adjacent surfaces of the carbon fiber reinforced resin substrate (A) and the glass fiber reinforced resin substrate (B) are bonded to each other" refers to that the "whole of adjacent surfaces of the carbon fiber reinforced resin substrate (A) and the glass fiber reinforced resin substrate (B) are bonded to each other. There may be adjacent surfaces which are not bonded to each other as long as the area proportion of the adjacent surfaces which are not bonded to each other is 20% or less of the entire area of the adjacent surfaces.

In addition, in the invention, as the "reference plane between the carbon fiber reinforced resin substrate (A) and the glass fiber reinforced resin substrate (B)", a horizontal line at the middle position between a line (line A) drawn horizontally from the position of the thermoplastic resin fiber located farthest from the surface of the layer of the carbon fiber reinforced resin substrate (A) and a line (line B) drawn horizontally from the position of the glass fiber located closest to the surface of the layer of the carbon fiber reinforced resin substrate (A) is adopted as the reference plane.

Figure 8A:
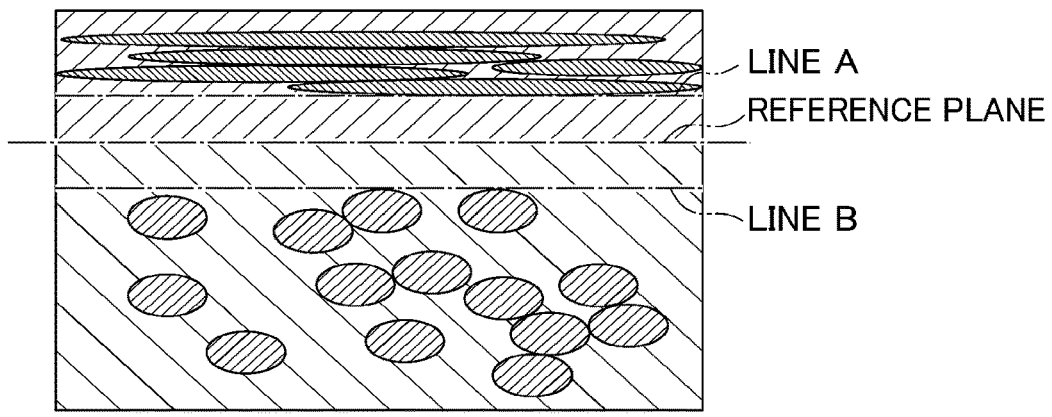
FIG. 8A is a diagram which illustrates a reference plane.
Figure 8B:
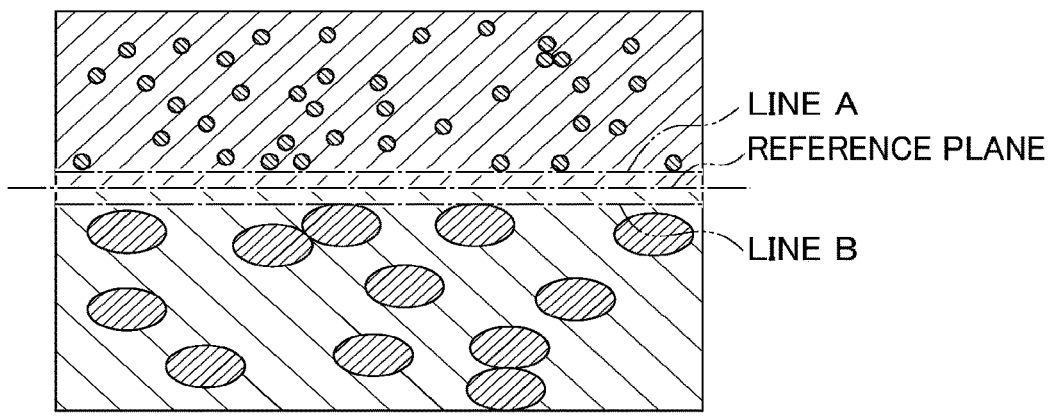
FIG. 8B is a diagram which illustrates a reference plane.
Figure 8C:
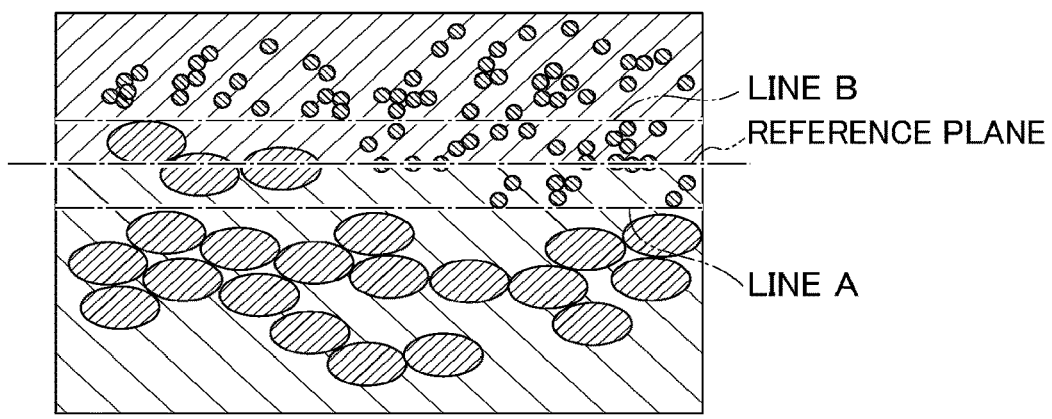
FIG. 8C is a diagram which illustrates a reference plane.

For example, as illustrated in FIGS. 8A to 8C, the line A and the line B are drawn on the cross section of the laminated substrate, a horizontal line is drawn in the middle of the line A and the line B, and this is adopted as the reference plane.

The "portion corresponding to 50% square of the thickness of the carbon fiber reinforced resin substrate (A)" means a region surrounded by a square of which the length of one side is 50% of the thickness of the carbon fiber reinforced resin substrate (A).

The "portion adjacent to the reference plane" means a region surrounded by a square of which one side overlaps with the reference plane.

In the laminated substrate of the invention, it is preferable that the interface height difference is $2.0 \times 10^{-3}$ to 1.5 mm as determined by the following test for interface height difference measurement. When the outer surface height difference is too small, the adhesive property of the laminated interface decreases, the peeling property increases, and the mechanical performance of the sandwich structure cannot be exerted. In addition, when the interface height difference is too high, homogeneous performance cannot be obtained and a decrease in strength may be caused by partial stress concentration in some cases. The interface height difference is more preferably 0.01 mm or more and 1.0 mm or less.

(Test for Interface Height Difference Measurement)

1. A laminated substrate formed of a carbon fiber reinforced resin substrate (A) and a glass fiber reinforced resin substrate (B) is cut perpendicular to a planar direction.

2. A distance from an outer surface of the carbon fiber reinforced resin substrate (A) to a closest interface portion and a distance from the outer surface of the carbon fiber reinforced resin substrate (A) to a farthest interface portion are measured in a range from a center in a transverse direction (cross section) of the cut laminated substrate to 25 mm left and 25 mm right.

Figure 9:
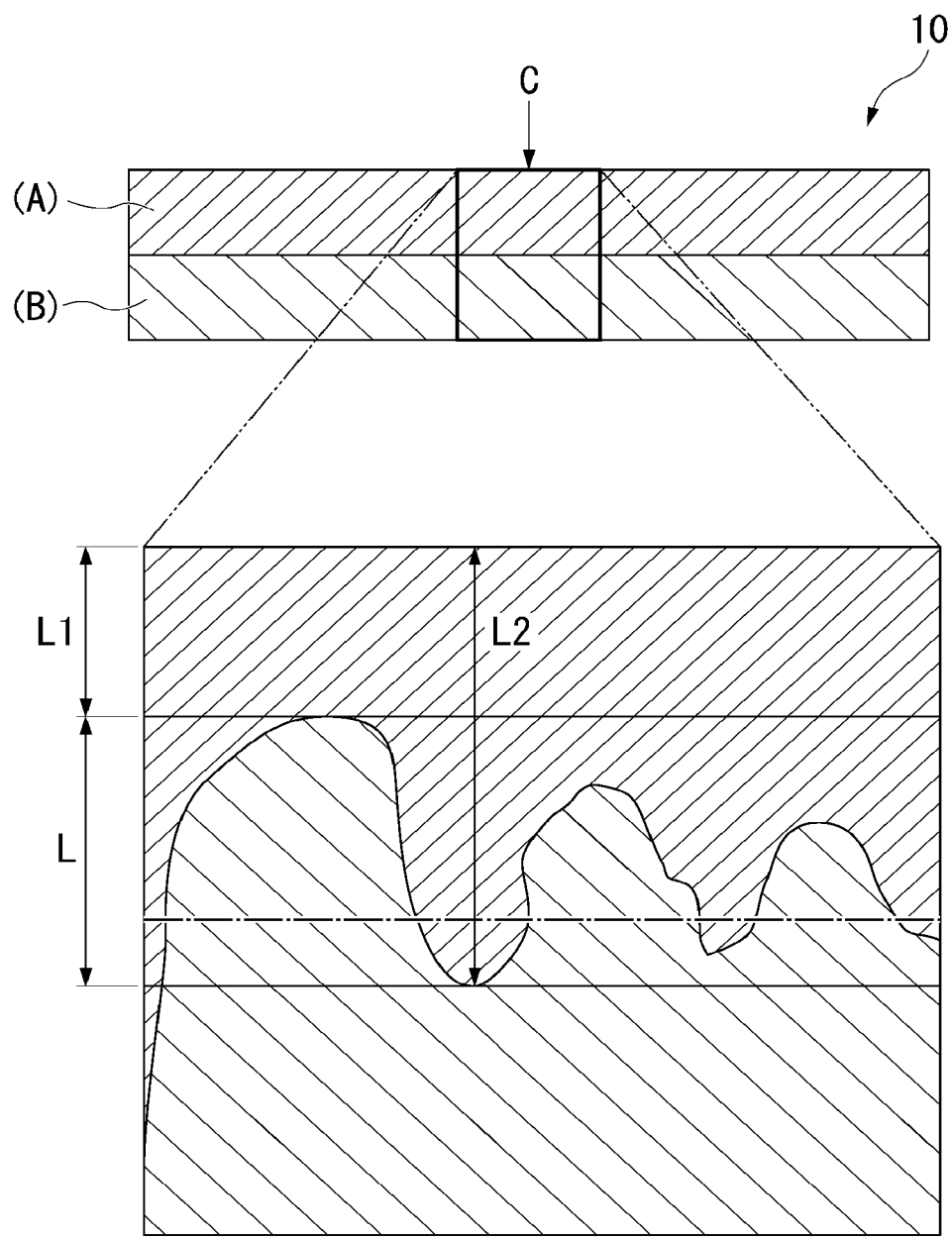
FIG. 9 is a diagram which illustrates a test for interface height difference measurement.

3. A difference between the measurement values obtained is determined as an interface height difference (FIG. 9).

In the test for interface height difference measurement, the determination of interface height difference can be conducted by carrying out the following 1. to 3. being carried out.

1. A laminated substrate formed of a carbon fiber reinforced resin substrate (A) and a glass fiber reinforced resin substrate (B) is cut perpendicular to a planar direction, and a cross section of the cut laminated substrate is photographed. For cutting, for example, a precision cutting machine (IKEGAMI SEIKI CO., LTD. ISPP-1000) can be used. The cross section may be photographed, for example, using an SEM (JEOL JSM-5600) and reflection electrons at an acceleration voltage of 15 kV and a magnification of 30-fold.

2. A distance (L1) from an outer surface of the carbon fiber reinforced resin substrate (A) to a closest interface portion and a distance (L2) from the outer surface of the carbon fiber reinforced resin substrate (A) to a farthest interface portion are measured in a range from a center in a transverse direction (cross section) of the laminated substrate to 25 mm left and 25 mm right (namely, in a range of 50 mm) on the cross-sectional photograph thus obtained (FIG. 9).

3. A difference (L) between the measurement values thus obtained is adopted as an interface height difference.

<Method for Manufacturing Carbon Fiber Reinforced Resin Substrate (a)>

The method for manufacturing carbon fiber reinforced resin substrate (A) of the invention is not particularly limited, but examples thereof may include a method in which a mixture in a state in which those that are in a cotton-like or crimped state and fonned of thermoplastic resin fibers are mixed with those obtained by cutting carbon fibers into an arranged certain length is charged into a carding machine, defibrated, and mixed to obtain a web, the webs are put on top of another in cross-layer and entangled by needle punching.

In addition, as a method for obtaining the web, there is also a method in which the mixture is defibrated using a defibrating machine in advance and then charged into the carding machine.

<Method for Manufacturing Glass Fiber Reinforced Resin Substrate (B)>

A laminate of a plurality of glass fiber layers (C) composed of continuous swirl-like glass fiber strands and/or chopped glass fiber strands and a nonwoven fabric layer of thermoplastic resin fiber (D) interposed between the plurality of glass fiber layers (C) is needle punched from both the upper and lower sides to fabricate a glass fiber composite mat. Furthermore, in order to obtain the glass fiber reinforced resin substrate, a thermoplastic resin fiber (E) which is not derived from the nonwoven fabric layer (D) of the mat is formed into a sheet shape using an extruder as well as the mat is laminated on both sides of the extruded thermoplastic resin sheet and heated and pressurized using the roller of a heating and pressurizing apparatus. The thermoplastic resin fibers constituting the nonwoven fabric layer (D) are completely melted, cooled, and solidified to fabricate a glass fiber reinforced resin substrate having a sheet shape.

<Method for Manufacturing Laminated Substrate>

The laminated substrate of the invention can be manufactured by heating and pressurizing the carbon fiber reinforced resin substrate (a) and the glass fiber reinforced resin substrate (B) described above. The carbon fiber reinforced resin substrate (a) to be the carbon fiber reinforced resin substrate (A) is disposed as an outer layer of the glass fiber reinforced resin substrate (B) which has been heated at a temperature of the melting point+30° C. in advance and is used as a core material, and the laminate is heated and pressurized using a pressing machine having a heating and pressurizing function under the following conditions. Thereafter, the resultant laminate is cooled and solidified to obtain a laminated substrate.

The heating temperature is preferably the melting point−50° C. or more and more preferably the melting point−20° C. or more and preferably the melting point+100° C. or less and more preferably the melting point+30° C. or less.

Specifically, the heating temperature is preferably from the melting point−50° C. to the melting point+100° C., and more preferably from the melting point−20° C. to the melting point+50° C. More specifically, the heating temperature is preferably from 120° C. to 250° C., and more preferably from 150° C. to 230° C. When the heating temperature is too low, the resin impregnating property in the carbon fiber reinforced resin substrate (A) deteriorates and the reinforcing effect decreases. When the heating temperature is too high, the resin degradation occurs and the original performance cannot be obtained.

The pressurization is preferably 1 MPa or more and more preferably 3 MPa or more and preferably 15 MPa or less and more preferably 10 MPa or less since the shaping property decreases when the pressurization is too low, and damage is caused to the mold when the pressurization is too high. Specifically, the pressurization is preferably from 1 to 15 MPa, more preferably from 1 to 15 MPa, and still more preferably from 3 to 10 MPa.

Examples of an apparatus for heating and pressurization may include a pressing machine having a heating and cooling function.

EXAMPLES

Hereinafter, the invention will be specifically described with reference to Examples, but the invention is not limited thereto.

<Measurement of Elongation Percentage at Maximum Load Point in MD Direction and TD Direction at Temperature of Melting Point of Resin Constituting Thermoplastic Resin Fiber of Carbon Fiber Reinforced Resin Substrate (a)+20° C.>

The "elongation percentage at the maximum load point" in the invention was measured by a method conforming to ISO 9073-3. A test piece having a width of 32.5 mm and a total length of 230 mm was sampled from the carbon fiber reinforced resin substrate (A), and the elongation percentage at the maximum load until the test piece was fractured was measured using a universal testing machine (Model 5982 manufactured by Illinois Tool Works Inc.). This elongation percentage refers to the percentage of the elongation (=(length at maximum load)−(length of test piece between grips)) of the test piece at the maximum load with respect to the length of test piece between grips. This elongation percentage was measured for four test pieces, N=4, and these elongation percentages were arithmetically averaged, and this average value was adopted as the elongation percentage at the maximum load point. Incidentally, the measurement was conducted under conditions of a length of test piece between grips of 130 mm and a tensile testing speed of 65 mm/min. The "MD direction" in the invention refers to the machine direction at the time of shortage and non-production, and the "TD direction" refers to the direction orthogonal to the "MD direction".

<Measurement of Tensile Stress at Melting Point of Resin Constituting Thermoplastic Resin Fiber of Carbon Fiber Reinforced Resin Substrate (a)+20° C.>

The "tensile stress" in the invention was measured by a method conforming to ISO 9073-3. A test piece having a width of 32.5 mm and a total length of 230 mm was sampled from the carbon fiber reinforced resin substrate (A), and the maximum load until the test piece was fractured was measured using a universal material testing machine (Model 5982 manufactured by Illinois Tool Works Inc.). This maximum load was measured for four test pieces, N=4, and these maximum loads were arithmetically averaged, and this average value was adopted as the tensile stress. Incidentally, the measurement was conducted under conditions of a length of test piece between grips of 130 mm and a tensile testing speed of 65 mm/min.

<Measurement of Rate of Area Increase>

The rate of area increase δ was calculated by the following method based on the test for evaluation on the rate of area increase.

The glass fiber reinforced resin substrate (B) and the carbon fiber reinforced resin substrate (a) were cut into 12 cm×12 cm.

The cut glass fiber reinforced resin substrate (B) was preliminarily heated at 215° C. for 13 minutes, subsequently the cut carbon fiber reinforced resin substrate (a) was laminated thereon so that the glass fiber reinforced resin substrate (B) and the carbon fiber reinforced resin substrate (A) accorded with each other in planar view.

The laminate obtained was set at the center of a pressing machine provided with a metal frame of 20 cm×20 cm so that the glass fiber reinforced resin substrate (B) became an underside and pressed at 5 MPa and a temperature of the melting point of the resin of the carbon fiber reinforced resin substrate (a)+20° C. for 10 minutes.

The area of the carbon fiber reinforced resin substrate (a) after pressing (namely, the area of the carbon fiber reinforced resin substrate (A)) was measured as Sample (α) Area.

The rate of area increase δ of the carbon fiber reinforced resin substrate (a) was calculated by the following equation.

$$\delta = \{(\text{Sample}(\alpha)\text{Area} - \text{Sample}(\beta)\text{Area})/\text{area of test piece}\} \times 100$$

In the above equation, Sample (α) Area denotes the area of the carbon fiber reinforced resin substrate (a) after pressing (namely, the area of the carbon fiber reinforced resin substrate (A)), Sample (β) Area denotes the area of the test piece before pressing, specifically is 144 cm². In addition, the area of the test piece is also specifically 144 cm².

The area was calculated from the image subjected to binarization processing using the Image J apparatus. The conditions at that time were luminance type: 8 bits, threshold: pixe 150 to 250, area: Infinity, and circularity: 0.0 to 1.0.

<Measurement of Retention Rate of Theoretical Bending Elastic Modulus>

The retention rate of theoretical bending elastic modulus ΔE was calculated by the following method.

$$\Delta E = (E' - E'')/E'$$

$$E' = (1 - \alpha^3) \times Ef + \alpha^3 \times Ec$$

Where E' denotes the theoretical elastic modulus, E'' denotes the actually measured elastic modulus, α denotes the thickness ratio of the laminated substrate (=thickness of glass fiber reinforced resin substrate/thickness of carbon fiber reinforced resin substrate), Ef denotes the elastic modulus of the carbon fiber reinforced resin substrate (A), and Ec denotes the elastic modulus of the glass fiber reinforced resin substrate (B), respectively.

<Evaluation on Shape-Shaping Property>

Figure 10:
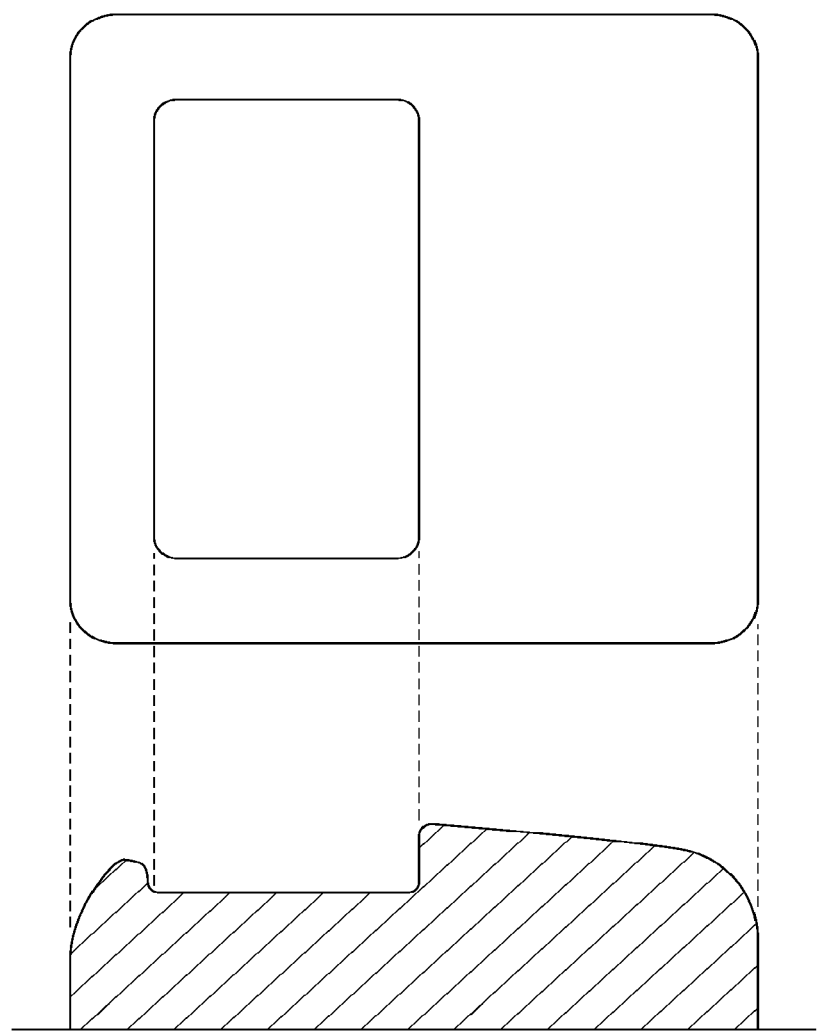
FIG. 10 is a diagram which illustrates a mold used for evaluation on shape-shaping property.

As the test piece to be used in the evaluation on the shape-shaping property, an evaluation piece was prepared by heating and pressurizing the carbon fiber reinforced resin substrate (a) and the glass fiber reinforced resin substrate (B) by the same molding method as in the method for manufacturing a laminated substrate. Specifically, the carbon fiber reinforced resin substrate (a) to be the carbon fiber reinforced resin substrate (A) was disposed as an outer layer of the glass fiber reinforced resin substrate (B) which had been heated at a temperature of the melting point+30° C. in advance and was used as a core material, and the laminate was heated and pressurized using a pressing machine having a heating and pressurizing function. Thereafter, the resultant laminate was cooled and solidified to obtain a laminated substrate. At that time, the mold illustrated in FIG. 10 was used as a mold to conduct the evaluation.

As the evaluation method, the evaluation was conducted by appearance evaluation as follows. The shape-shaping property was judged to be poor in a case in which the carbon fiber reinforced resin substrate (A) after molding was cracked, fissured, and fractured.

<Evaluation on Bending>

A test piece for bending test (width: 15 mm, thickness: 3 mm, and length: 80 mm) was fabricated in conformity to ISO 14125, the distance between supporting points was set to 60 mm using a jig for three-point bending test (radius of indenter: 5 mm), and the bending elastic modulus was measured under the test conditions of a testing speed of 2 mm/min. As the testing machine, a universal tension and compression tester 50 kN Model 2050 (manufactured by INTESCO Co., ltd.) was used.

<Evaluation on Compression>

A test piece for compression test (width: 15 mm, thickness: 3 mm, and length: 80 mm) was fabricated in conformity to ISO 14126, the length between tabs was set to 10 mm using a compression jig, and the evaluation on compression was conducted under the test conditions of a testing speed of 1 mm/min. As the testing machine, a universal tension and compression tester 50 kN Model 2050 (manufactured by INTESCO Co., ltd.) was used.

<Evaluation on Short Beam>

A test piece for short beam (width: 20 mm, thickness: 4 mm, and length: 40 mm) was fabricated in conformity to ISO 14130, the distance between supporting points was set to 8 mm using a jig for three-point bending test (radius of indenter: 5 mm), and the short beam test was conducted under the test conditions of a testing speed of 1 mm/min. As the testing machine, a universal tension and compression tester 50 kN Model 2050 (manufactured by INTESCO Co., ltd.) was used.

Example 1

[Manufacture of Carbon Fiber Reinforced Resin Substrate (a)]

Those obtained by cutting unstretched polypropylene fibers into an average fiber length of 45 mm and those obtained by cutting PAN-based carbon fibers (15K, average fiber diameter: 7 μm) into an average fiber length of 60 mm were blended together so as to have a mass ratio of 40:60. The blended material thus obtained was charged into a carding machine, defibrated, and mixed to obtain a web, and the webs were put on top of another in cross-layer and entangled by needle punching to manufacture a carbon fiber reinforced resin substrate (a) (MD tensile elongation percentage: 97%, TD tensile elongation percentage: 61%, MD tensile stress: 0.023 MPa, and TD tensile stress: 0.054 MPa).

[Manufacture of Glass Fiber Reinforced Resin Substrate (B)]

Glass fiber composite material GMT (product number: P4038-BK31, Vf: 20%, average fiber diameter: 13 μm, and average fiber length: 40 mm or more) manufactured by Quadrant Plastic Composites Japan Ltd. was used as the glass fiber reinforced resin substrate (B).

[Simultaneous Manufacture of Laminated Substrate and Molded Body]

The glass fiber reinforced resin substrate (B) was heated in a warm air circulating type oven set to a temperature of 215° C. for 13 minutes, this was used as a core material, the carbon fiber reinforced resin substrate (a) was disposed to be superimposed on the front and back surfaces of the core material, and the laminate was quickly set in a metal mold heated to 160° C. in advance, held at a pressure of 5 MPa for 5 minutes, and cooled to 80° C. or less to obtain a molded body composed of a laminated substrate in which the adjacent surfaces of the carbon fiber reinforced resin substrate (A) and the glass fiber reinforced resin substrate (B) were bonded to each other.

Example 2

A carbon fiber reinforced resin substrate (a) in which the mixing ratio of carbon fibers was set to 70% by mass and the fibers were entangled by needle punching and which had a basis weight of 600 g/m$^2$ was obtained, and a laminated substrate was obtained in the same manner as in Example 1 except that this was used.

Example 3

A carbon fiber reinforced resin substrate (a) in which the mixing ratio of carbon fibers was set to 80% by mass and the fibers were entangled by needle punching and which had a basis weight of 600 g/m$^2$ was obtained, and a laminated substrate was obtained in the same manner as in Example 1 except that this was used.

Example 4

GMT (the same GMT as GMT used in Example 1) as the glass fiber reinforced resin substrate (B) was heated in a warm air circulating type oven set to a temperature of 215° C. for 13 minutes, this was used as a core material, the carbon fiber reinforced resin substrate (a) (the carbon fiber reinforced resin substrate (a) used in Example 1) was disposed to be superimposed on the front and back surfaces of the core material, and the laminate was quickly set in a metal mold heated to 160° C. in advance, held at a pressure of 5 MPa for 5 minutes, and cooled to 80° C. or less to obtain a molded body composed of a laminated substrate in which the adjacent surfaces of the carbon fiber reinforced resin substrate (A) and the glass fiber reinforced resin substrate (B) were bonded to each other.

The average value of deviations (1) of the molded body determined by the uniformity test method 1-1 was 0.075%, the average value of deviations (2) thereof determined by the uniformity test method 1-2 was 5.0%, further, the average value of deviations (3) thereof determined by the uniformity test method 2-1 was 4.3%, and the average value of deviations (4) thereof determined by the uniformity test method 2-2 was 10.8%, respectively.

Example 5

GMT (the same GMT as GMT used in Example 1) as the glass fiber reinforced resin substrate (B) was heated in a warm air circulating type oven set to a temperature of 215° C. for 13 minutes, this was used as a core material, the carbon fiber reinforced resin substrate (a) (the carbon fiber reinforced resin substrate (a) used in Example 2) was disposed to be superimposed on the front and back surfaces of the core material, and the laminate was quickly set in a metal mold heated to 160° C. in advance, held at a pressure of 5 MPa for 5 minutes, and cooled to 80° C. or less to obtain a molded body composed of a laminated substrate in which the adjacent surfaces of the carbon fiber reinforced resin substrate (A) and the glass fiber reinforced resin substrate (B) were bonded to each other.

The average value of deviations (1) of the molded body determined by the uniformity test method 1-1 was 0.075%, the average value of deviations (2) thereof determined by the uniformity test method 1-2 was 3.6%, further, the average value of deviations (3) thereof determined by the uniformity test method 2-1 was 4.7%, and the average value of deviations (4) thereof determined by the uniformity test method 2-2 was 5.92%, respectively.

Example 6

GMT (the same GMT as GMT used in Example 1) as the glass fiber reinforced resin substrate (B) was heated in a warm air circulating type oven set to a temperature of 215° C. for 13 minutes, this was used as a core material, the carbon fiber reinforced resin substrate (a) (the carbon fiber reinforced resin substrate (a) used in Example 1) was disposed to be superimposed on the front and back surfaces of the core material, and the laminate was quickly set in a metal mold heated to 160° C. in advance, held at a pressure of 5 MPa for 5 minutes, and cooled to 80° C. or less to obtain a molded body composed of a laminated substrate in which the adjacent surfaces of the carbon fiber reinforced resin substrate (A) and the glass fiber reinforced resin substrate (B) were bonded to each other.

The average value of deviations (1) of the molded body determined by the uniformity test method 1-1 was 2.9%, the average value of deviations (2) thereof determined by the uniformity test method 1-2 was 8.9%, further, the average value of deviations (3) thereof determined by the uniformity test method 2-1 was 0.58%, and the average value of deviations (4) thereof determined by the uniformity test method 2-2 was 3.5%, respectively.

Example 7

GMT (the same GMT as GMT used in Example 1 was used but the mass percentage thereof was 64% by mass) as the glass fiber reinforced resin substrate (B) was heated in a warm air circulating type oven set to a temperature of 215° C. for 13 minutes, this was used as a core material, the carbon fiber reinforced resin substrate (a) (the carbon fiber reinforced resin substrate (a) used in Example 1) was disposed to be superimposed on the front and back surfaces of the core material, and the laminate was quickly set in a metal mold heated to 160° C. in advance, held at a pressure of 5 MPa for 5 minutes, and cooled to 80° C. or less to obtain a molded body composed of a laminated substrate in which the adjacent surfaces of the carbon fiber reinforced resin substrate (A) and the glass fiber reinforced resin substrate (B) were bonded to each other.

The average value of deviations (1) of the molded body determined by the uniformity test method 1-1 was 0.95%, the average value of deviations (2) thereof determined by the uniformity test method 1-2 was 1.8%, further, the average value of deviations (3) thereof determined by the uniformity test method 2-1 was 6.7%, and the average value of deviations (4) thereof determined by the uniformity test method 2-2 was 12.19%, respectively.

Comparative Example 1

GMT (the same GMT as GMT used in Example 1) heated in a warm air circulating type oven set at 215° C. for 13 minutes in advance was disposed, subsequently a UD material (manufactured by Mitsubishi Chemical Corporation (product number: TR50S15L, CF: 51% by mass, 15K, average fiber diameter: 7 μm, and basis weight: 145 g/m$^2$)) was disposed thereon, the laminate was immediately held at a pressure of 5 MPa for 5 minutes, and then the mold was cooled to 80° C. or less to obtain a laminated substrate.

Comparative Example 2

A laminated substrate was obtained in the same manner as in Comparative Example 1 except that a UD slit material (product number: TR50S15L, CF: 51%, and basis weight: 145 g/m$^2$ manufactured by Mitsubishi Chemical Corporation) was used instead of the UD material.

Comparative Example 3

A laminated substrate was obtained using the same UD material and GMT as those in Comparative Example 1.

The average value of deviations (1) of the laminated substrate determined by the uniformity test method 1-1 was 1.2%, the average value of deviations (2) thereof determined by the uniformity test method 1-2 was 28.3%, further, the average value of deviations (3) thereof determined by the uniformity test method 2-1 was 0.22%, and the average value of deviations (4) thereof determined by the uniformity test method 2-2 was 11.3%, respectively.

TABLE 1

|  | Example 1 | Example 2 | Example 3 | Comparative Example 1 | Comparative Example 2 |
|---|---|---|---|---|---|
| MD tensile elongation percentage [%] | 97 | 60.1 | 35.9 | 1.28 | 1.26 |
| TD tensile elongation percentage [%] | 61.1 | 39.3 | 39.9 | —✗ | 1.26 |
| MD tensile stress [MPa] | 0.023 | 0.024 | 0.024 | 374.9 | 133 |

TABLE 1-continued

| | | | | | |
|---|---|---|---|---|---|
| TD tensile stress [MPa] | 0.054 | 0.065 | 0.058 | 0 | 133 |
| Rate of area increase [%] | <5 | <5 | <5 | 7 | 23 |
| Retention rate of theoretical elastic modulus | −0.08% | −9.46% | −12.10% | −24.10% | −29.20% |
| Shape-shaping property | ⊙ | ○ | ○ | X | X |
| Average value of deviations (1) | — | — | — | — | — |
| Average value of deviations (2) | — | — | — | — | — |
| Average value of deviations (3) | — | — | — | — | — |
| Average value of deviations (4) | — | — | — | — | — |
| Evaluation on bending | — | — | — | — | — |
| Evaluation on compression | — | — | — | — | — |
| Evaluation on short beam | — | — | — | — | — |

| | Example 4 | Example 5 | Comparative Example 3 | Example 6 | Example 7 |
|---|---|---|---|---|---|
| MD tensile elongation percentage [%] | 97 | 60.1 | 1.28 | 97 | 97 |
| TD tensile elongation percentage [%] | 61.1 | 39.3 | —* | 61.1 | 61.1 |
| MD tensile stress [MPa] | 0.023 | 0.024 | 374.9 | 0.023 | 0.023 |
| TD tensile stress [MPa] | 0.054 | 0.065 | 0 | 0.054 | 0.054 |
| Rate of area increase [%] | <5 | <5 | 7 | <5 | <5 |
| Retention rate of theoretical elastic modulus | −0.08% | −9.46% | −24.10% | −0.08% | −0.08% |
| Shape-shaping property | ⊙ | ○ | X | ⊙ | ⊙ |
| Average value of deviations (1) | 0.075 | 0.075 | 1.2 | 2.93 | 0.953 |
| Average value of deviations (2) | 4.95 | 3.56 | 28.3 | 8.89 | 1.84 |
| Average value of deviations (3) | 4.3 | 4.7 | 0.22 | 0.581 | 6.66 |
| Average value of deviations (4) | 5.27 | 5.92 | 11.3 | 3.54 | 12.19 |
| Evaluation on bending | ○ | ○ | X | X | X |
| Evaluation on compression | ○ | ○ | X | X | X |
| Evaluation on short beam | ○ | ○ | X | X | X |

In Table 1, "-*" means that the elongation percentage at the maximum load point in the MD direction was low and thus the elongation percentage at the maximum load point in the TD direction was not measured.

INDUSTRIAL APPLICABILITY

The laminated substrate of the invention has high industrial value since it exhibits excellent flowability at the time of molding to make it possible to easily fabricate a molded body having a complicated three-dimensional shape and also to efficiently impart mechanical properties and a reinforcing effect when laminating two or more kinds of fiber-resin composite materials.

EXPLANATIONS OF LETTERS OR NUMERALS

10 LAMINATED SUBSTRATE
1 PORTION 1
2 PORTION 2
(A) CARBON FIBER REINFORCED RESIN SUBSTRATE (A)
(B) GLASS FIBER REINFORCED RESIN SUBSTRATE (B)
(a) SAMPLE (α) Area
(b) SAMPLE (β) Area

The invention claimed is:

1. A laminated substrate obtained by laminating carbon fiber reinforced resin substrates (a) comprising a discontinuous carbon fiber and a thermoplastic resin fiber and a glass fiber reinforced resin substrate (B) comprising a glass fiber and a thermoplastic resin, wherein
 a content of the discontinuous carbon fiber in the carbon fiber reinforced resin substrates (a) is 20% by mass or more and less than 100% by mass with respect to a total mass of the carbon fiber reinforced resin substrate (a),
 an average fiber length of the discontinuous carbon fiber in the carbon fiber reinforced resin substrate (a) is 30 to 150 mm,
 the carbon fiber reinforced resin substrates (a) have an elongation percentage of from 20% to 150% at a maximum load point in a MD direction at a temperature of a melting point of a resin constituting the thermoplastic resin fiber+20° C., an elongation percentage of from 20% to 150% at a maximum load point in a TD direction, and a tensile stress of $1.0 \times 10^{-3}$ to $1.0 \times 10^{-1}$ MPa, and
 wherein said glass fiber reinforced resin substrate (B) is sandwiched between said carbon fiber reinforced resin substrates (a).

2. A laminated substrate, wherein
 adjacent surfaces of carbon fiber reinforced resin substrates (A) comprising a discontinuous carbon fiber and a thermoplastic resin and a glass fiber reinforced resin substrate (B) comprising a glass fiber and a thermoplastic resin are bonded to each other,
 a content of the discontinuous carbon fiber in the carbon fiber reinforced resin substrates (A) is 20% by mass or more and 80% by mass or less with respect to a total mass of the carbon fiber reinforced resin substrates (A) wherein
 an average value of deviations (1) determined by the following uniformity test method 1-1 is 5% or less, and
 an average value of deviations (2) determined by the following uniformity test method 1-2 is 8% or less:
(Uniformity Test Method 1-1)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. Three portions 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) are extracted from the cross-sectional photograph obtained;

3. Area proportions (%) occupied by a discontinuous carbon fiber at the portions 1 are respectively determined and an average value (%) of the area proportions at the three portions 1 is calculated; and
4. A difference between the average value (%) and the area proportion (%) occupied by a discontinuous carbon fiber at each portion 1 is determined as a deviation (1), and (Uniformity Test Method 1-2)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. A portion 1 corresponding to 50% square of a thickness of the carbon fiber reinforced resin substrate (A) on a carbon fiber reinforced resin substrate (A) side adjacent to a reference plane between the carbon fiber reinforced resin substrate (A) and the glass fiber reinforced resin substrate (B) is extracted from the cross-sectional photograph obtained;
3. The portion 1 is equally divided into nine cells, and area proportions (%) occupied by a discontinuous carbon fiber in the respective divided cells are calculated;
4. An average value (%) of the area proportions occupied by a discontinuous carbon fiber in the equally divided nine cells is calculated from the area proportions (%) occupied by a discontinuous carbon fiber in the respective cells; and
5. A difference between the average value (%) and the area proportion (%) occupied by a discontinuous carbon fiber in each cell is determined as a deviation (2), and
wherein said class fiber reinforced resin substrate (B) is sandwiched between said carbon fiber reinforced resin substrates (A).

3. The laminated substrate according to claim 2, wherein a content percentage of the glass fiber in the glass fiber reinforced resin substrate (B) is more than 0% by mass and less than 60% by mass with respect to a total mass of the glass fiber reinforced resin substrate (B),
an average value of deviations (3) determined by the following uniformity test method 2-1 is 10% or less, and
an average valve of deviations (4) determined 1w the following uniformity test method 2-2 is 10% or less:

(Uniformity Test Method 2-1)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. Three portions 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) are extracted from the cross-sectional photograph obtained;
3. Area proportions (%) occupied by a glass fiber at the portions 2 are respectively determined and an average value (%) of the area proportions at the three portions 2 is calculated; and
4. A difference between the average value (%) and the area proportion (%) occupied by a glass fiber at each portion 2 is determined as a deviation (3), and (Uniformity Test Method 2-2)
1. a laminated substrate formed of a carbon fiber reinforced resin substrate (A) and a glass fiber reinforced resin substrate (B) is cut perpendicular to a planar direction, and a cross section of the cut laminated substrate is photographed;
2. A portion 2 corresponding to 1.0 mm×1.0 mm on a glass fiber reinforced resin substrate (B) side adjacent to a reference plane between the carbon fiber reinforced resin substrate (A) and the glass fiber reinforced resin substrate (B) is extracted from the cross-sectional photograph obtained;
3. The portion 2 is equally divided into nine cells, and area proportions (%) occupied by a glass fiber in the respective divided cells are calculated;
4. An average value (%) of the area proportions occupied by a glass fiber in the equally divided nine cells is calculated from the area proportions (%) occupied by a glass fiber in the respective cells; and
5. A difference between the average value (%) and the area proportion (%) occupied by a glass fiber in each cell is determined as a deviation (4).

4. The laminated substrate according to claim 2, wherein an interface height difference determined by the following test for interface height difference measurement is $2.0 \times 10^{-3}$ to 1.5 mm:

(Test for Interface Height Difference Measurement)
1. a laminated substrate formed of a carbon fiber reinforced resin substrate (A) and a glass fiber reinforced resin substrate (B) is cut perpendicular to a planar direction;
2. A distance from an outer surface of the carbon fiber reinforced resin substrate (A) to a closest interface portion and a distance from the outer surface of the carbon fiber reinforced resin substrate (A) to a farthest interface portion are measured in a range from a center in a transverse direction of the cut laminate to 25 mm left and 25 mm right; and
3. A difference between the measurement values obtained is determined as an interface height difference.

5. The laminated substrate according to claim 1, wherein an average fiber diameter of the thermoplastic resin fibers in the carbon fiber reinforced resin substrates (a) is from 20 to 100 μm.

6. The laminated substrate according to claim 1, wherein an average fiber length of the glass fibers in the glass fiber reinforced resin substrate (B) is 5 mm or more.

7. The laminated substrate according to claim 1, wherein the thermoplastic resin in the glass fiber reinforced resin substrate (B) and a resin constituting the thermoplastic resin fiber in the carbon fiber reinforced resin substrates (a) are polypropylene, and
an elongation percentage at a maximum load point in a MD direction of the carbon fiber reinforced resin substrates (a) at a temperature of a melting point of the polypropylene+20° C. is from 100% to 150% and an elongation percentage at a maximum load point in a TD direction is from 100% to 150%.

8. The laminated substrate according to claim 1, wherein the thermoplastic resin in the glass fiber reinforced resin substrate (B) and a resin constituting the thermoplastic resin fiber of the carbon fiber reinforced resin substrates (a) are polyamide, and
an elongation percentage at a maximum load point in a MD direction of the carbon fiber reinforced resin substrates (a) at a temperature of a melting point of the polyamide 20° C. is from 20% to 150%.

9. The laminated substrate according to claim 1, wherein a rate of area increased of the carbon fiber reinforced resin substrates (a) in the following test is less than 5.0%:

(Test for Evaluation on Rate of Area Increase)
the glass fiber reinforced resin substrate (B) and the carbon fiber reinforced resin substrate (a) are cut into 12 cm×12 cm;
the cut glass fiber reinforced resin substrate (B) is preliminarily heated at 215° C. for 13 minutes, subsequently the cut carbon fiber reinforced resin substrate (a) is laminated so that the glass fiber reinforced resin substrate (B) and the carbon fiber reinforced resin substrate (a) accord with each other in planar view;
the laminate obtained is set at a center of a pressing machine provided with a metal frame of 20 cm×20 cm so that the glass fiber reinforced resin substrate (B) becomes an underside and pressed at 5 MPa and a temperature of a melting point of a resin of the carbon fiber reinforced resin substrate (a)+20° C. for 10 minutes;
an area of the carbon fiber reinforced resin substrate (a) after pressing is measured as Sample (α) Area; and
a rate of area increase δ of the carbon fiber reinforced resin substrate (a) is calculated by the following equation:

$$\delta = \{(Sample(\alpha)Area - Sample(\beta)Area)/area\ of\ test\ piece\} \times 100$$

Sample(β)Area: area of test piece before pressing=144 cm², and
area of test piece=144 cm².

10. The laminated substrate according to claim 1, wherein a thickness of the carbon fiber reinforced resin substrates (a) when a pressure of 3 MPa is applied to the carbon fiber reinforced resin substrate (a) and then removed from the carbon fiber reinforced resin substrate (a) is 40% or more and 95% or less of a thickness of the carbon fiber reinforced resin substrate (a) before the pressure of 3 MPa is applied to the carbon fiber reinforced resin substrate (a).

11. The laminated substrate according to claim 1, wherein a basis weight of the carbon fiber reinforced resin substrates (a) is from 100 g/m² to 800 g/m².

12. A method for manufacturing the laminated substrate according to claim 1, which comprises:
laminating carbon fiber reinforced resin substrates (a) and the glass fiber reinforced resin substrate (B); and
heating and pressurizing the laminate obtained at from 120° C. to 250° C., and from 1 to 10 MPa to integrate the carbon fiber reinforced resin substrates (a) and the glass fiber reinforced resin substrate (B).

13. The laminated substrate according to claim 1, wherein a content of the discontinuous carbon fiber in the carbon fiber reinforced resin substrates (a) is 60% to 80% by mass with respect to a total mass of the carbon fiber reinforced resin substrates (a).

14. The laminated substrate according to claim 1, wherein the discontinuous carbon fiber in the carbon fiber reinforced resin substrates (a) is entangled.

15. The laminated substrate according to claim 2, wherein an average fiber length of the discontinuous carbon fiber in the carbon fiber reinforced resin substrates (A) is from 30 mm to 150 mm.

16. The laminated substrate according to claim 2, wherein the discontinuous carbon fiber in the carbon fiber reinforced resin substrates (A) is entangled.

17. The laminated substrate according to claim 2, wherein a content of the discontinuous carbon fiber in the carbon fiber reinforced resin substrates (A) is 60 to 80% by mass with respect to a total mass of the carbon fiber reinforced resin substrates (A).

18. The laminated substrate according to claim 1, wherein a content of the discontinuous carbon fiber in the carbon fiber reinforced resin substrates (a) is 20 to 50% by mass with respect to a total mass of the carbon fiber reinforced resin substrates (a).

* * * * *